US009940654B1

(12) United States Patent
Davies et al.

(10) Patent No.: US 9,940,654 B1
(45) Date of Patent: Apr. 10, 2018

(54) NETWORK SYSTEM WITH SCHEDULED BREAKS

(71) Applicant: Uber Technologies, Inc., San Francisco, CA (US)

(72) Inventors: Brett Davies, Marietta, GA (US); Yulun Li, Mountain View, CA (US); Meng Huang, San Francisco, CA (US); Zhewu Zhou, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 15/602,540

(22) Filed: May 23, 2017

Related U.S. Application Data

(63) Continuation of application No. 15/600,631, filed on May 19, 2017.

(51) Int. Cl.
| | | |
|---|---|---|
| *G06Q 30/00* | (2012.01) | |
| *G06Q 30/06* | (2012.01) | |
| *G06Q 10/08* | (2012.01) | |
| *G06Q 50/10* | (2012.01) | |

(52) U.S. Cl.
CPC ..... *G06Q 30/0613* (2013.01); *G06Q 30/0605* (2013.01); *G06Q 30/0619* (2013.01); *G06Q 10/087* (2013.01); *G06Q 50/10* (2013.01)

(58) Field of Classification Search
CPC .......... G06Q 30/0601; G06Q 30/0635; G06Q 30/0639
USPC ................... 705/26.1, 26.81, 26.9
See application file for complete search history.

(56) References Cited

U.S. PATENT DOCUMENTS

| | | | |
|---|---|---|---|
| 9,639,908 B1 | 5/2017 | Reiss | |
| 2009/0248435 A1 | 10/2009 | Macwan | |
| 2013/0144831 A1* | 6/2013 | Atlas | G06N 5/02 706/50 |
| 2013/0345958 A1* | 12/2013 | Paek | G01C 21/3679 701/400 |
| 2015/0046083 A1 | 2/2015 | Maitra | |

(Continued)

FOREIGN PATENT DOCUMENTS

| | | |
|---|---|---|
| EP | 2789980 | 9/2011 |
| WO | WO2016113602 | 7/2016 |

OTHER PUBLICATIONS

Ryan, Refueling at Your Fingertips, Apr. 26, 2016, Uber Technologies.*

(Continued)

*Primary Examiner* — Brandy A Zukanovich
*Assistant Examiner* — Brittney N Miller
(74) *Attorney, Agent, or Firm* — Mahamedi IP Law LLP

(57) ABSTRACT

A method and system for scheduled breaks are described. A network computer system receives provider data corresponding to a request to initiate a pause state with the network service and also receives a position of the service provider from a computing device equipped with a location-based resource. In response to receiving the request, the network computer system selects a facility, based on a selection objective, from facilities that are associated with the pause state and at least one of the position of the service provider and a destination of a service task that is to be completed. The network computer system transmits data corresponding to the selected facility to the computing device to be displayed on a user interface of the computing device.

16 Claims, 11 Drawing Sheets

(56) References Cited

U.S. PATENT DOCUMENTS

| | | | |
|---|---|---|---|
| 2015/0332425 A1* | 11/2015 | Kalanick | G06Q 50/30 |
| | | | 705/13 |
| 2015/0339923 A1 | 11/2015 | Godafoss | |
| 2015/0377642 A1* | 12/2015 | Poppen | G01C 21/3476 |
| | | | 701/426 |
| 2016/0119405 A1 | 4/2016 | Karpoor | |
| 2016/0148141 A1 | 5/2016 | Kwak | |

OTHER PUBLICATIONS

Carson, Biz, Uber wants to help drivers find cheap gas and maybe even the bathroom, Apr. 25, 2016, Business Insider.*

Uber rolls out app upgrades for its drivers, Benner, Katie, Jun. 8, 2016, International New York Times, p. 14.*

* cited by examiner

NETWORK SYSTEM WITH SCHEDULED BREAKS

CROSS-REFERENCE TO RELATED APPLICATIONS

This application is a continuation of U.S. patent application Ser. No. 15/600,361, filed May 19, 2017, which application is hereby fully incorporated herein by reference.

BACKGROUND

A network service can enable users to request and receive various services through applications on mobile computing devices. The network service typically selects a service provider to fulfill the request for service based on user-specified data from the request. These service providers can interact with the network service to accept or decline service requests, receive data about the requesting users, and set various status modes such as whether the provider is online and available to fulfill requests or offline.

DETAILED DESCRIPTION

Figure 1:
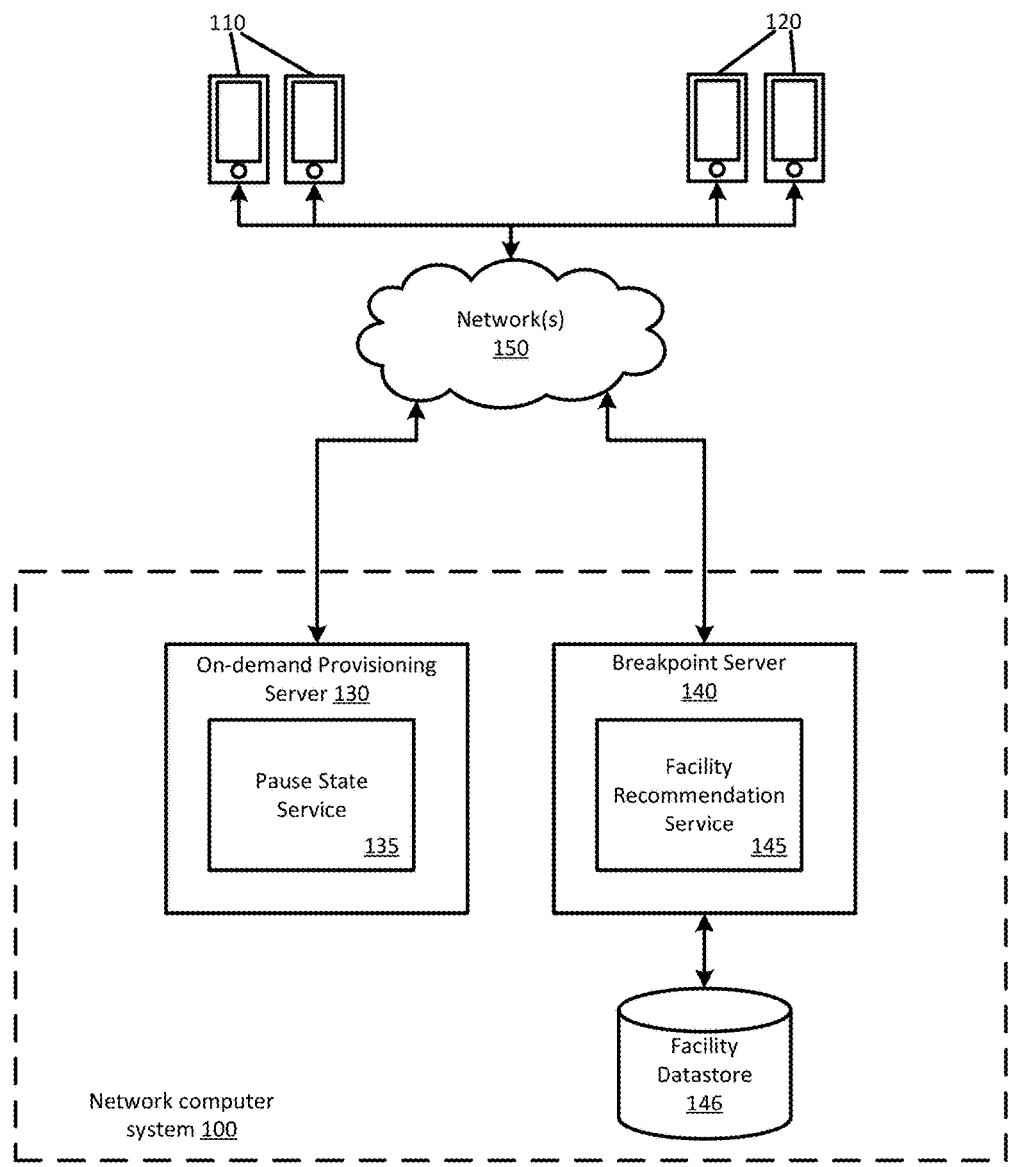
FIG. 1 is a block diagram illustrating an example network computer system in communication with service requester and service provider devices, in accordance with examples described herein.

A network computer system is provided herein that manages an on-demand network-based service linking available service providers with service requesters throughout a given region (e.g., a metroplex such as the San Francisco Bay Area). According to examples, the network computer system can receive service requests for on-demand services (e.g., transport service or delivery service) from requesting users (e.g., a rider) via a designated service requester application executing on the users' mobile computing devices. Based, at least in part, on a service start location, the network computer system can identify a number of proximate available service providers (e.g., a driver) and transmit a service invitation message to one or more service provider devices of the proximate available service providers to fulfill the service request (e.g., provide or perform the corresponding service). In many examples, the service providers can either accept or decline the invitation based on, for example, the service start location or service destination being impractical for the service provider.

In some examples, in selecting a service provider to fulfill a given service request, the network computer system can identify candidate service providers to fulfill the service request based on a service start location indicated in the service request. For example, the network computer system can determine a geo-fence (e.g., a region specified by three or more location points or a defined area, such as a hexagon from an array of hexagons) surrounding the service start location (or a geo-fence defined by a radius away from the service start location), identify a set of candidate service providers (e.g., twenty or thirty service providers within the geo-fence), and select a service provider (e.g., the closest service provider to the service start location, service provider with the shortest estimated travel time from the service start location, service provider traveling to a location within a specified distance or specified travel time to the destination location, etc.) from the set of candidate service providers to fulfill the service request. According to examples provided herein, the network computer system can compile historical data for individual service requesters with regard to the network-based service. Thus, the network computer system can manage a service requester profile for each service requester indicating routine start and/or end locations (or regions), and/or routine routes (e.g., for a transportation service from home to work and/or vice versa) and preferred service types (e.g., transportation, delivery, mailing, etc.). In some examples, the network computer system can further synchronize with a service requester device to, for example, identify the service requester's contacts, the service requester's schedule and appointments, travel plans (e.g., a scheduled trip), and the like.

Between service requests, providers may require breaks to find facilities to use the restroom, refuel their vehicle, or grab a snack. However, in the course of providing service, requests can take providers to unfamiliar areas of town where they do not know good locations to take breaks. In addition, service providers do not know factors, such as current supply, demand, and pricing for the area, which may influence their decision for where to take a break. Therefore, a facility recommendation service can recommend facilities to use during the break to service providers. In some aspects, the facility recommendation service locates and recommends facilities based on selection objectives for the service provider, such as reducing idle time, reducing costs, increasing revenues, or increasing the comfort level of the service provider.

Service providers may be reluctant to take a break and go offline with the network service because of the potential for lost opportunities. However, if providers remain online while taking a break, they could be rushed or arrive late in responding to a service request. Therefore, the on-demand network service can provide support for a pause state that keeps providers online during a break but accounts for the duration of the break when calculating how long it takes for the service provider to reach a service requester. In some aspects, a service provider in the pause state is available to fulfill service requests after a threshold amount of time in the break has passed, but the provider's estimated time to arrival is subject to a penalty based on the remaining duration of time for the pause state.

Among other benefits, the examples described herein achieve a technical effect of providing on-demand network-based service providers with increased control and stability over scheduling. By sending service requests to providers in a pause state, the provider can queue the request and act on it as soon as their break is over, thereby reducing idle time spent waiting to receive a service request, increasing service provider availability, reducing wait times for users, and delivering a more reliable product for users. The pause state functionality can also increase service provider engagement with features of the service provider application and help prevent providers from inadvertently taking long breaks.

In addition, the examples described herein achieve a technical effect of improving supply provisioning algorithms for a network service system. Instead of service providers going offline for a break and therefore becoming invisible to the system, supply provisioning algorithms can account for service providers in an online pause state. This allows the network service system to better provision service providers and set service prices.

The network computer system can utilize efficiency features such as forward dispatching and automatic acceptance to reduce downtime and improve the efficiency of the overall system for both providers and requesting customers; however, these features can make taking a break difficult for providers. Service providers may be able to block future service requests and go offline once their queue is empty, but while offline, they cannot take advantage of the efficiency features. In order to enable the benefits of these efficiency features to persist across breaks, a service provider can select to enter a pause state rather than go offline after their queue is empty. This gives service providers more peace of mind and flexibility when providing services through the network computer system, which can increase the average usage of the system and reduce waiting times for users.

By sending service requests to providers in the pause state (e.g., on break using the restroom, refueling their vehicle, grabbing a snack, etc.), the provider can queue the request and act on it as soon as their break is over, thereby reducing idle time spent waiting to receive a service request, increasing service provider availability, reducing wait times for users, and delivering a more reliable product for users.

According to examples described herein, a network computer system receives provider data corresponding to a position of a computing device of a service provider. The network computer system determines a service state of the service provider, including (i) an open state, indicating the service provider is active and unassigned to any service request, (ii) an occupied state, indicating the service provider is assigned to a corresponding service request, and (iii) a pause state, indicating the service provider is unavailable for a remaining duration of time. In response to receiving a service request specifying a service location (e.g., a pickup location) and a determination that the service provider is in the pause state, the network computer system estimates a time of arrival at the service location for the service provider based at least on the remaining duration of time for the pause state and the position of the computing device. Based on the estimated time of arrival at the service location, the network computer system selects the service provider to fulfill the service request and transmits data corresponding to the service request to the computing device of the service provider.

In some aspects, the estimated time of arrival at the service location for the service provider in the pause state is determined based at least on a sum of (i) travel time from the position of the computing device to the service location and (ii) the remaining duration of time that service provider is unavailable. In addition, the travel time is determined from historical travel time data and local conditions, including traffic and weather, and selecting the service provider to fulfill the service request is based on minimizing the estimated time of arrival for the service request.

In some aspects, the network computer system selects service providers for each of multiple service requests to minimize the estimated time of arrival for at least two of the multiple service requests collectively.

In some aspects, data corresponding to the service request is transmitted to the computing device of the service provider to be displayed on a user interface of the computing device.

In some aspects, the network computer system increases the remaining duration of time for the service provider in the pause state in response to receiving an extension request from the service provider.

In some aspects, the computing device communicates the provider data through execution of a corresponding service application.

According to examples described herein, a network computer system receives provider data corresponding to a request to initiate a pause state with the network service and also receives a position of the service provider from a computing device equipped with a location-based resource. In response to receiving the request, the network computer system selects a facility, based on a selection objective, from facilities that are associated with the pause state and at least one of the position of the service provider and a destination of a service task that is to be completed. The network computer system transmits data corresponding to the selected facility to the computing device to be displayed on a user interface of the computing device.

In some aspects, the data corresponding to the selected facility is to be displayed within a list of facilities on the user interface of the computing device. In addition, the network computer system receives, from the service provider, input choosing the selected facility from the list of facilities, and transmits navigation information corresponding to a route from the position to the selected facility to be displayed on the user interface of the computing device.

In some aspects, the facilities associated with the pause state are determined to accommodate the service provider during the pause state.

In some aspects, the selection objective includes one or more of reducing idle time for the service provider, reducing costs to the service provider, and increasing revenues for the service provider. In addition, the selection objective is based on, at least, supply provisioning information for the network service for a surrounding area of each of the facilities. Furthermore, the supply provisioning information includes current pricing data for the network service for the surrounding area of each of the facilities.

In some aspects, the supply provisioning information is estimated for a time when the pause state is expected to end.

In some aspects, selecting the facility is also based on facility ratings, accessibility, cleanliness, service provider preferences, distance from the position or destination, and/or available discounts.

In some aspects, the data corresponding to the selected facility is displayed on the user interface upon determining that the service provider is not currently providing service to a user.

In some aspects, the network computer system receives, from the service provider, a selection of a type of facility accommodation and filters the facilities based on whether they include the type of facility accommodation selected. In some examples, facility accommodations include gas stations and restrooms.

In some aspects, the network computer system selects a default type of facility accommodation based on a current time of day and/or duration of time the service provider has been active that day.

As provided herein, the terms "user" and "service requester" are used throughout this application interchangeably to describe a person or group of people who utilize a service requester application on a computing device to request, over one or more networks, on-demand services from a network computer system. The term "service provider" is used to describe a person utilizing a service provider application on a computing device to provide on-demand services to the service requesters.

One or more aspects described herein provide that methods, techniques, and actions performed by a computing device are performed programmatically or as a computer-implemented method. Programmatically means through the use of code or computer-executable instructions. A programmatically performed step may or may not be automatic.

One or more aspects described herein may be implemented using programmatic modules or components. A programmatic module or component may include a program, a subroutine, a portion of a program, a software component, or a hardware component capable of performing one or more stated tasks or functions. In addition, a module or component can exist on a hardware component independently of other modules or components. Alternatively, a module or component can be a shared element or process of other modules, programs, or machines.

Furthermore, one or more aspects described herein may be implemented through the use of instructions that are executable by one or more processors. These instructions may be carried on a computer-readable medium. Machines shown or described with figures below provide examples of processing resources and computer-readable media on which instructions for implementing some aspects can be carried out or executed. In particular, the numerous machines shown in some examples include processors and various forms of memory for holding data and instructions. Examples of computer-readable media include permanent memory storage devices, such as hard drives on personal computers or servers. Other examples of computer storage media include portable storage units, such as CD or DVD units, flash or solid state memory (such as carried on many cell phones and consumer electronic devices) and magnetic memory. Computers, terminals, network-enabled devices (e.g., mobile devices such as cell phones) are all examples of machines and devices that utilize processors, memory, and instructions stored on computer-readable media.

Alternatively, one or more examples described herein may be implemented through the use of dedicated hardware logic circuits that are comprised of interconnected logic gates. Such circuits are typically designed using a hardware description language (HDL), such as Verilog or VHDL. These languages contain instructions that ultimately define the layout of the circuit. However, once the circuit is fabricated, there are no instructions, and the processing is performed by interconnected logic gates.

System Overview

FIG. 1 is a block diagram illustrating an example network computer system 100 in communication with service requester and service provider devices, in accordance with examples described herein. The network computer system 100 can implement or manage a network service (e.g., an on-demand transport or delivery arrangement service) that connects service requesters with service providers that are available to fulfill the service requests that service requesters transmit to the network computer system 100. An on-demand provisioning server 130 managing the network service can enable service requesters to submit requests over one or more networks 150 through a service requester application executing on the service requester devices 110. The network service processes and transmits the requests to appropriate service providers by way of a service provider application executing on the service provider devices 120. As used herein, a service requester device 110 and a service provider device 120 can comprise computing devices with functionality to execute designated applications corresponding to the network service managed by the network computer system 100. In many examples, service requester devices 110 and service provider devices 120 can comprise mobile computing devices, such as smartphones, tablet computers, virtual reality or augmented reality headsets, on-board computing systems of vehicles, and the like. Example network services can comprise delivery of food or products, package mailing, shopping, construction, plumbing, home repair, housing or apartment sharing, etc., or can include transportation arrangement services. In an example using transport arrangement services, the service requesters are prospective passengers to be picked up and transported, and the service providers are drivers who transport the service requesters.

During long shifts, service providers may require breaks to use the restroom, refuel their vehicle, or grab a snack. However, service providers may be reluctant to take a break and go offline with the network service because of the potential for lost opportunities. Furthermore, if providers take a break and remain online, they could be rushed or arrive late in responding to a service request. Therefore, the on-demand provisioning server 130 can provide support for a pause state service 135 that keeps providers online during a break but accounts for the duration of the break when calculating an estimated time of arrival for service requests. By sending service requests to providers in a pause state, the provider can queue the request and act on it as soon as their break is over, thereby reducing idle time spent waiting to receive a service request, increasing service provider availability, reducing wait times for users, and delivering a more reliable product for users.

The network computer system 100 can also include a breakpoint server 140 to provide data models to the service requester devices 110 and service provider devices 120. In some aspects, a facility recommendation service 145 can help service providers find restrooms, gas stations, restaurants, etc. to take a break at by recommending facilities based on selection objectives for the service provider.

According to examples, service interfaces on the on-demand provisioning server 130 and breakpoint server 140 enable the network computer system 100 to exchange data with the service requester devices 110 and the service provider devices 120 over the network 150. For example, the service interfaces can use one or more network resources to exchange communications over one or more wireless networks (e.g., a cellular transceiver, a WLAN transceiver, etc.). The service interfaces can include or implement an externally-facing application programming interface (API) to communicate data with the service requester devices 110 and the service provider devices 120. The externally-facing API can provide access to the on-demand provisioning server 130 or the breakpoint server 140 via secure channels over the network 150 through any number of methods, including web-based forms, programmatic access via restful APIs, Simple Object Access Protocol (SOAP), remote procedure call (RPC), scripting access, etc.

In some examples, the facility recommendation service 145 stores data and metadata for facilities (e.g., gas stations, public restrooms, fast food restaurants, coffee shops, etc.) associated with the pause state in a facility datastore 146. Metadata can include hours of operation for the facility, restroom availability and accessibility, prices, etc. The metadata can be sourced from business development relationships, public information, and submissions from service providers and other users. In some aspects, service providers can submit ratings and comments for facilities through the service provider application when the providers take a break at a facility.

Figure 2:
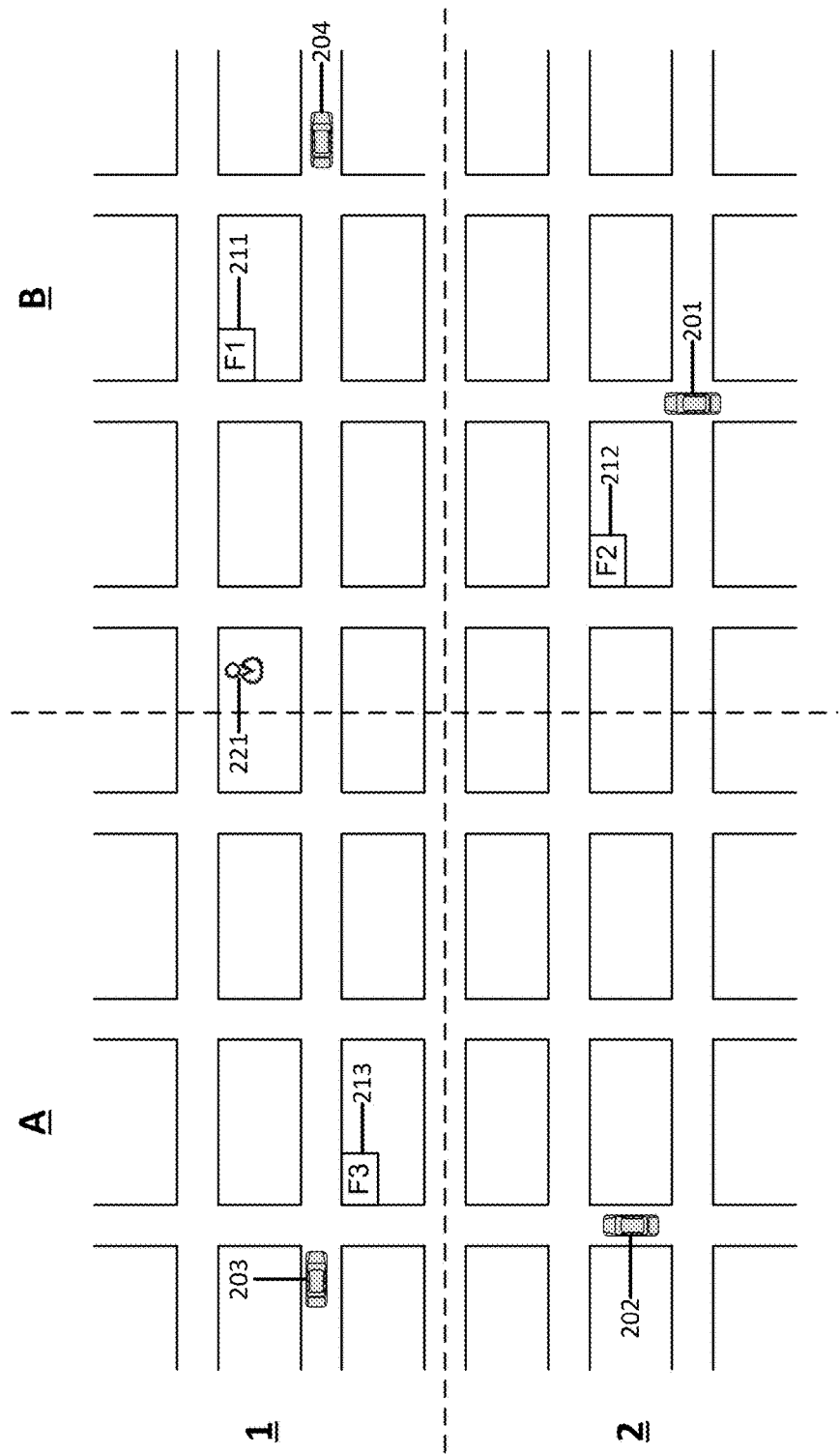
FIG. 2 is a block diagram illustrating an example map scenario, in accordance with examples described herein.

FIG. 2 is a block diagram illustrating an example map scenario, in accordance with examples described herein. A service provider 201 driving a vehicle as part of providing services through the network computer system requests a break through the service provider application. Since the provider might not be familiar with this area of town and also does not know current supply, demand, and pricing for the area, a facility recommendation service can recommend facilities for the break to the service provider 201.

In order to determine which facilities are local to the service provider 201, the network computer system receives a position of the service provider 201 from a computing device equipped with a location-based resource. For example, a global positioning system (GPS) tracker built in to a mobile phone running the service provider application can transmit its location to the network computer system. The facility recommendation system then searches a facility datastore for local facilities based on the location of the service provider 201.

In order to determine which of the facilities to recommend, the facility recommendation service can estimate an impact that taking a break at that facility may have on selection objectives for the service provider 201. Selection objectives, or service objectives, include any metrics that the service provider 201 or the network computer system can use to measure or evaluate performance of the service provider, service tasks, the network computer system itself, etc. Examples of selection objectives include idle time for the service provider, costs to the service provider or system, and revenues for the service provider or system. In addition, service objectives can include subjective assessments, such as provider satisfaction or contentment. Accordingly, the facility recommendation service can choose facilities in order to optimize one or more of the selection objectives, such as by reducing idle time for the service provider 201, reducing costs to the service provider 201, increasing revenues for the service provider 201, or increasing the comfort level of the service provider 201.

For each of the facilities, the facility recommendation service determines values for a number of criteria related to the selection objectives. In one aspect, the facility recommendation service estimates a travel distance and/or an amount of travel time between the service provider 201 location and each of the facilities 211, 212, 213. These estimates can take into consideration historical and current local conditions in the area, such as traffic, the difficulty of finding parking, how busy a given facility is, etc., which may increase the amount of time necessary for a service provider 201 to reach the facility and complete a break. For example, facility 211 with a public restroom may be five minutes away but typically require five minutes to find parking, whereas facility 213 may be eight minutes away but require negligible time to find parking. Thus, despite being further away, the second facility 213 may be a better choice for reducing idle time for the service provider 201.

The facility recommendation service can also estimate, or retrieve from another system (e.g., the on-demand provisioning server), supply provisioning information for the network service for a surrounding area of each of the facilities 211, 212, 213. The supply provisioning information indicates supply and demand for services in the surrounding areas of each of the facilities 211, 212, 213. The supply provisioning information can include historical data, current data, and predictive data for the future. Among other values, these data can include counts or estimates of service providers, service requesters, service requests, time between receiving service requests for service providers (i.e., idle time), wait time for service requesters, and pricing data for services in each area.

In the example of FIG. 2, the local map is divided into four supply provisioning areas: A1, A2, B1, and B2. Based on a larger number of service requesters in one of the areas, idle times for service providers in that area may be lower, and prices for providing service higher. Therefore, despite facilities 211 and 213 being further away from service provider 201, it may be beneficial to the provider's selection objectives to take a break at one of them rather than the closer facility 212.

Based on the distance, predicted idle time, and pricing information, the facility recommendation service recommends that service provider 201 takes a break at the facility 211 in area B1. In some aspects, the duration of the pause state is set to begin once the service provider 201 arrives at the facility 211. While the service provider 201 is in the pause state using the restroom, refueling their vehicle, eating, etc., the on-demand network service can monitor the remaining duration of time for the pause state.

In the example illustrated, a service requester 221 utilizes the on-demand network service through a service requester application to transmit a service request to the network computer system. The network computer system can utilize service provider locations and map data to calculate ETA data for nearby service providers 201, 202, 203, 204 in order to select which of the providers should fulfill the service request. In some aspects, the network computer system selects an available service provider that is closest to the service location associated with the service request (e.g., a pickup location) with respect to distance or time.

For the service provider 201 in the pause state at the facility 211, the on-demand network service can determine an ETA at the service location based on the remaining duration of time of the pause state and the position of the service provider 201 or service provider computing device. In some aspects, during a first phase of the pause state, the service provider 201 is set as ineligible for requests regardless of ETA. For example, the on-demand network service may pass over the service provider 201 if they have been on break for fewer than five minutes (or alternatively, if they have more than five minutes remaining in their break).

However, once the remaining duration of time for the pause state crosses below a threshold, the service provider 201 is made available for requests again, subject to an ETA penalty, or "negative ETA," based on the remaining duration of time for the pause state (for example, in some embodiments the ETA penalty may equal the remaining duration of time for the pause state). The ETA penalty reduces the likelihood that service providers in a pause state receive a service request because their rank in the provider selection process is reduced below active, open service providers in the area due to their higher ETA. In some aspects, the ETA at the service location for the service provider in the pause state is determined based at least on a sum of the travel time from the position of the computing device to the service location and the ETA penalty (e.g., the remaining duration of time that service provider is unavailable in the pause state).

As a result, if the service provider 201 recently began the break at the facility 211 when the service requester 221 transmits a request, the network computer system may select one of the other service providers 202, 203, 204 to fulfill the service request, despite the service requester 201 in the pause state being the closest to the service requester 221. However, as the remaining duration for the pause state decreases, the corresponding ETA penalty is also reduced, and the likelihood that the service provider 201 receives a service request increases. Accordingly, if the service requester 221 transmits a request near the end of the provider's break, the network computer system may select service provider 201 because, despite being on break, the service provider 201 can finish the break and reach the service requester 221 before the other service providers 202, 203, 204 in the area.

Figure 3:
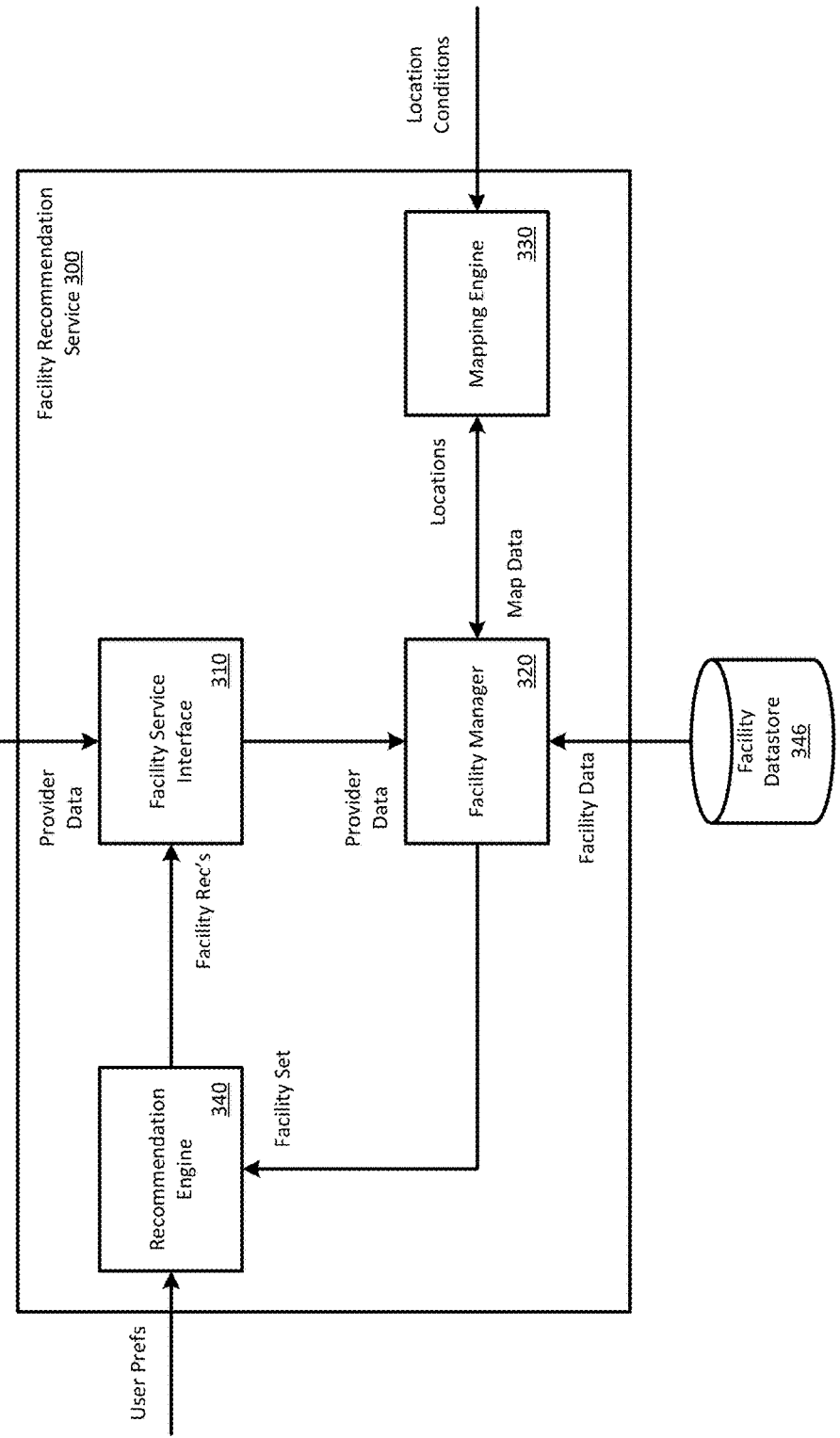
FIG. 3 is a block diagram illustrating an example facility recommendation service, in accordance with examples described herein.

FIG. 3 is a block diagram illustrating an example facility recommendation service 300, in accordance with examples described herein. A service provider who provides services through the network computer system 100 can select a pause state using the service provider application in order to, for example, take a short break to use the bathroom, refuel their vehicle, or get coffee.

In one aspect, the facility recommendation service 300 recommends local facilities (e.g., gas stations, public restrooms, fast food restaurants, coffee shops, etc.) to accommodate the service provider during the break. In order to determine which facilities are local to the service provider, a facility service interface 310 can receive provider data, including a position of the service provider. In some examples, a global positioning system (GPS) tracker built in to a mobile phone running the service provider application can transmit its location to the network computer system 100, either directly to the facility service interface 310 or to another component of the network computer system 100, such as the breakpoint server 140.

A facility manager 320 searches a facility datastore 346 for local facilities based on the location of the service provider from the provider data. In some aspects, the facility manager 320 can search for facilities based on a destination for the service provider's service task. For example, if the service provider requests a break while providing transportation for a passenger, the facility recommendation service can search for facilities that are located near the planned drop off point for the passenger.

The facility datastore 346 stores metadata for facilities that are associated with the pause state. Metadata can include hours of operation for the facility, restroom availability and accessibility, prices, etc. The metadata can be sourced from business development relationships, public information, and submissions from service providers and other users. In some aspects, service providers can submit ratings and comments for facilities through the service provider application when the providers take a break at a facility.

The facility recommendation service 300 can include a mapping engine 330, or can utilize a third-party mapping service, to generate map data, including traffic data based on local conditions, in the environment surrounding the service start location. In addition, the mapping engine 330 can retrieve service provider locations from the facility manager 320, a provider datastore, or provider tracking component and include the locations with the map data. In some implementations, the functionality of the mapping engine 330 is provided on a separate server that the facility recommendation service 300 accesses, which may be part of the network computer system or the third-party mapping service.

In addition to searching for facilities based on location, the facility manager 320 can search for facilities based on facility categories, or types of accommodation that each facility provides. For example, whether a restaurant has a public restroom or not. The service provider can select a category, such as gas stations or restrooms, through the service provider application in order to limit the facility search to facilities in that category. If the service provider does not specify a category when requesting the pause state or at any point before the pause state is triggered, the facility manager 320 can search on a default category or a category based on stored service provider preferences.

In one aspect, the facility manager 320 selects a default category used for facility searches based on predictive factors such as the time of day and how long the service provider has been online. For example, the facility manager 320 may default to searching for gas stations in the morning or evening when the service provider is more likely to need to refuel, and the facility manager 320 may default to searching for restrooms when the service provider has been online for an extended period of time without a break. In addition, the facility manager 320 can model predictive factors and determine preferences for the service provider based on previous behavior of the service provider or aggregate statistical data, subject to any privacy or opt-in settings the service provider has selected.

Using map data from the mapping engine 330, the facility manager 320 determines a set of facilities near (i.e., within a threshold distance of) the location of the service provider or service task destination that match the selected or default category. In order to determine which of the facilities to recommend, the facility manager 320 can estimate an impact that taking a break at that facility may have on selection objectives for the service provider. Selection objectives, or service objectives, include any metrics that the service provider or the network computer system 100 can use to measure or evaluate performance of the service provider, service tasks, the network computer system 100 itself, etc. Examples of selection objectives include idle time for the service provider, costs to the service provider or system, and revenues for the service provider or system. In addition, service objectives can include subjective assessments, such as provider satisfaction or contentment. Accordingly, the facility manager 320 can choose facilities in order to optimize one or more of the selection objectives, such as by reducing idle time for the service provider, reducing costs to the service provider, increasing revenues for the service provider, or increasing the comfort level of the service provider.

For each of the facilities, the facility manager 320 determines values for a number of criteria related to the selection objectives. In one aspect, the facility manager 320 estimates a travel distance and/or an amount of travel time between the service provider location and the facility. These estimates can take into consideration historical and current local conditions in the area, such as traffic, the difficulty of finding parking, how busy a given facility is, etc., which may increase the amount of time necessary for a service provider to reach the facility and complete a break. For example, one fast food restaurant with a public restroom may be five minutes away but typically require five minutes to find parking, whereas another may be eight minutes away but require negligible time to find parking. Thus, despite being further away, the second restaurant may be a better choice for reducing idle time for the service provider.

The facility manager 320 can also estimate, or retrieve from another system (e.g., the on-demand provisioning server 130), supply provisioning information for the network service for a surrounding area of each of the facilities. The supply provisioning information indicates supply and demand for services in the surrounding areas of each of the facilities. The supply provisioning information can include historical data, current data, and predictive data for the future. Among other values, these data can include counts or estimates of service providers, service requesters, service requests, time between receiving service requests for service providers (i.e., idle time), wait time for service requesters, and pricing data for services in each area. In some aspects, the supply provisioning information is estimated for a time when the pause state is expected to end, and a set duration for the pause state begins once the service provider arrives at a chosen facility. For example, if a facility is five minutes from the service provider and the pause state is set for a 15 minute break, the facility recommendation service estimates supply provisioning information for 20 minutes in the future for the area surrounding that facility.

In addition to travel distance/time and supply provisioning criteria, the facility manager 320 can also retrieve ratings and various details related to the selection objectives from the facility datastore 346. Ratings for facilities can include user-submitted scores and reviews for each facility, including ratings for cleanliness, quality, etc. Other details can include accessibility information (e.g., handicap access), prices for food or gas, and any discounts that may be available for service providers.

Based on combinations of the criteria and their values, the facility manager 320 estimates an impact that taking a break at each facility may have on the selection objectives for the service provider. In some aspects, an estimated idle time for the service provider includes travel time to the facility and an expected wait time, based on the supply provisioning information, to receive a service request from the on-demand network service for a service provider in the pause state at or near that facility. Estimated costs to the service provider can include fuel or food prices at the facility in addition to fuel costs for driving to the facility. The facility manager 320 can estimate revenues for the service provider using pricing data from the supply provisioning information and the expected wait time to receive service requests.

Once the selection objective criteria values are calculated, a recommendation engine 340 can rank and select facilities from the set of facilities based on the selection objectives. In some aspects, an overall facility ranking is performed using a weighted ranking of at least some of the selection objectives. The recommendation engine 340 can use preferences and settings from the service provider to determine the selection objectives and their respective weights. For example, one service provider may place more weight on earning additional revenue, whereas another may place more weight on clean facilities and minimizing idle time.

The facility service interface 310 transmits data corresponding to the selected facilities (i.e., facility recommendations) and their rankings to the computing device of the service provider to be displayed on a user interface of the computing device. In some aspects, the selected facilities are displayed as a list of facilities on the user interface of the computing device, sorted by ranking from top to bottom.

Figure 4:
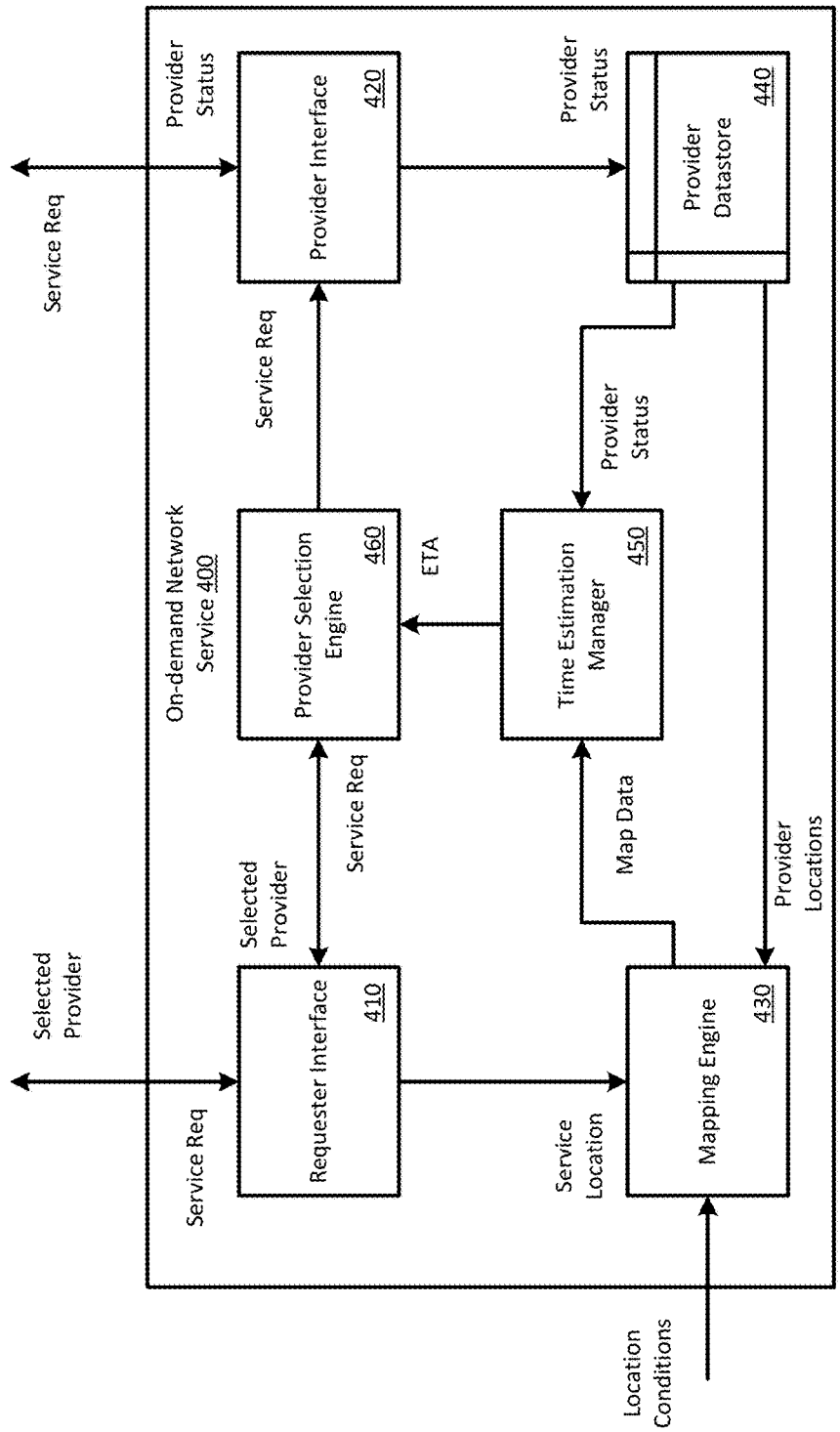
FIG. 4 is a block diagram illustrating an on-demand network service, in accordance with examples described herein.

FIG. 4 is a block diagram illustrating an on-demand network service 400, in accordance with examples described herein. The on-demand network service 400 can include a provider management interface 420 to communicate over one or more networks with a service provider application running on a service provider device. According to examples, service providers register with the on-demand network service 400 to receive service invitations through the service provider application to fulfill service requests submitted by the service requesters. In an example using transport services, the service requesters are prospective passengers to be picked up and transported, and the service providers are drivers who transport the service requesters.

Service providers can select various states or modes within the service provider application, such as an online state that indicates the service provider is available and willing to fulfill service invitations or a pause state that indicates the service provider is on a break and intends to resume fulfilling service invitations after the break. In some situations, service providers make themselves available to perform services for a block of time in a manner similar to a work shift or at sporadic times whenever convenient for the provider. For example, a driver providing transport services may choose to transport passengers for a few hours in the morning and in the afternoon. During long shifts, service providers may require breaks to use the restroom, refuel their vehicle, or grab a snack. However, service providers may be reluctant to take a break and go offline with the network service because of the potential for lost opportunities. Furthermore, if providers take a break and remain online, they could be rushed or arrive late in responding to a service request. Therefore, the on-demand network service 400 can provide support for a pause state that keeps providers online during a break but accounts for the duration of the break when calculating an estimated time of arrival for service requests.

In accordance with various examples, the service provider device transmits a provider status, which can include the provider mode, the current location of the service provider, and other provider information, over the network to the provider interface 420. In some implementations, the service provider devices can determine the current location of the service provider using location-based resources of the service provider devices (e.g., global positioning system (GPS) resources). The service provider application can continually update the provider status on a regular schedule or in response to provider input to the service provider device, location changes determined by GPS, service steps performed, etc. The provider interface 420 stores the provider status in a provider datastore 440 (e.g., a database or data structure) accessible by a provider selection engine 460 that processes incoming service requests in order to select service providers to fulfill the service requests.

The on-demand network service 400 can include a service requester interface 410 to communicate with service requester devices over one or more networks via a service requester application. In one implementation, the service requester application can enable the service requester to scroll through various service types. In response to a selection of a particular service type, the on-demand network service 400 can provide estimated time to arrival (ETA) data on a user interface of the service requester application that indicates the shortest ETA of nearby service providers for the service type and/or the locations of nearby service providers for that service type. As the service requester scrolls through each service type, the user interface can update to show visual representations of the service providers for that service type on a map centered on the service requester or a chosen service location. The service requester can interact with the user interface of the service requester application to select a particular service type and transmit a service request.

In some examples, the service request can include a service location within a given region (e.g., a metropolitan area managed by one or more datacenters corresponding to the network computer system 100) where a selected service provider is to rendezvous with the service requester. The service requester can input the service location by setting a location pin on a user interface of the service requester application, or the service location can be determined by a current location of the service requester (e.g., utilizing location-based resources of the service requester device). Additionally, the service requester can input a service destination during or after submitting the service request. In an example using transport services, the service requester is a prospective passenger that wants to be picked up at the service location and dropped off at the service destination.

In some examples, the on-demand network service 400 can include a mapping engine 430, or can utilize a third-party mapping service, to generate map data, including traffic data, in the environment surrounding the service location. In addition, the mapping engine 430 can retrieve service provider locations from the provider datastore 440 or provider tracking component and include the locations with the map data. In some implementations, the functionality of the mapping engine 430 is provided on a separate server that the on-demand network service 400 accesses, which may be part of the network computer system 100 or a third-party mapping service.

For service providers in the pause state, the on-demand network service 400 can monitor a remaining duration of time for the pause state. In one aspect, time and duration information for the pause state is stored with the provider status in the provider datastore 440, including when the pause state for the service provider begins, ends, and its total expected duration. The provider selection engine 460 processes incoming service requests from users to select service providers to fulfill the service requests. A time estimation manager 450 accesses the stored time and duration information to calculate estimated times to arrival (ETA) for providers in the pause state.

In some aspects, the time estimation manager 450 can determine an ETA at the service location for the service provider based on the remaining duration of time of the pause state and the position of the service provider or service provider computing device from the map data. In some aspects, during a first phase of the pause state, the service provider is set as ineligible for requests regardless of ETA. For example, the provider selection engine 460 may pass over a service provider who has been on a break for fewer than five minutes. However, once the remaining duration of time for the pause state crosses a threshold, the service provider is made available for requests again, subject to an ETA penalty, or "negative ETA," based on the remaining duration of time for the pause state. The ETA penalty reduces the likelihood that service providers in a pause state receive a service request because their rank in the provider selection process is reduced below active, open service providers in the area due to their higher ETA. In some aspects, the ETA at the service location for the service provider in the pause state is determined based at least on a sum of the travel time from the position of the computing device to the service location and the remaining duration of time that service provider is unavailable in the pause state. Therefore, as the remaining duration for the pause state decreases, the corresponding ETA penalty is also reduced, and the likelihood that the service provider receives a service request increases.

The provider selection engine 460 can utilize service provider ETAs from the time estimation manager 450 in order to select one of the proximate service providers to fulfill the service request. In some aspects, the provider selection engine 460 selects a service provider that has the lowest ETA to the service location, whether it is an available service provider or a service provider in the pause state with a negative ETA applied. If other nearby service providers have shorter ETAs than the service provider in the pause state, the on-demand network service may select one of the other providers. In one implementation, the provider selection engine 460 can select service providers for each of multiple service requests in order to minimize the estimated time of arrival for at least two of the multiple service requests collectively.

Once the provider selection engine 460 selects a service provider, the provider interface 420 can transmit the service request data to the selected service provider's device. In addition to the service location and ETA data, the provider interface 420 can transmit requester information, such as a name and photograph of the service requester. Upon receiving the service invitation, the service provider can either accept or reject the invitation. Rejection of the invitation can cause the provider selection engine 460 to determine another service provider from the candidate set of service providers to fulfill the service request. However, if the service provider accepts (e.g., via an acceptance input), then the acceptance input is transmitted back to the on-demand network service 400, which generates and transmits a confirmation of the service provider to the service requester.

If the provider selection engine 460 selects a provider in the pause state, since the ETA attached to the request already accounts for the time remaining in the pause state, the service provider can finish their break and begin heading to the service location once the pause state expires.

Methodology

FIGS. 5 through 8 are flow charts describing example methods used in recommending facilities to a service provider and selecting service providers in a pause state to fulfill a service request. Although some operations of the methods are described below as being performed by specific components of the computer systems illustrated in FIGS. 1, 3, and 4, it will be appreciated that these operations need not necessarily be performed by the specific components identified, and could be performed by a variety of components and modules, potentially distributed over a number of machines. Accordingly, references may be made to elements of the on-demand provisioning server 130 and breakpoint server 140 for the purpose of illustrating suitable components or elements for performing a step or sub step being described. Alternatively, at least certain ones of the variety of components and modules described in the pause state service 135 and facility recommendation service 145 can be arranged within a single hardware, software, or firmware component. It will also be appreciated that some of the steps of these methods may be performed in parallel or in a different order than illustrated.

Figure 5:
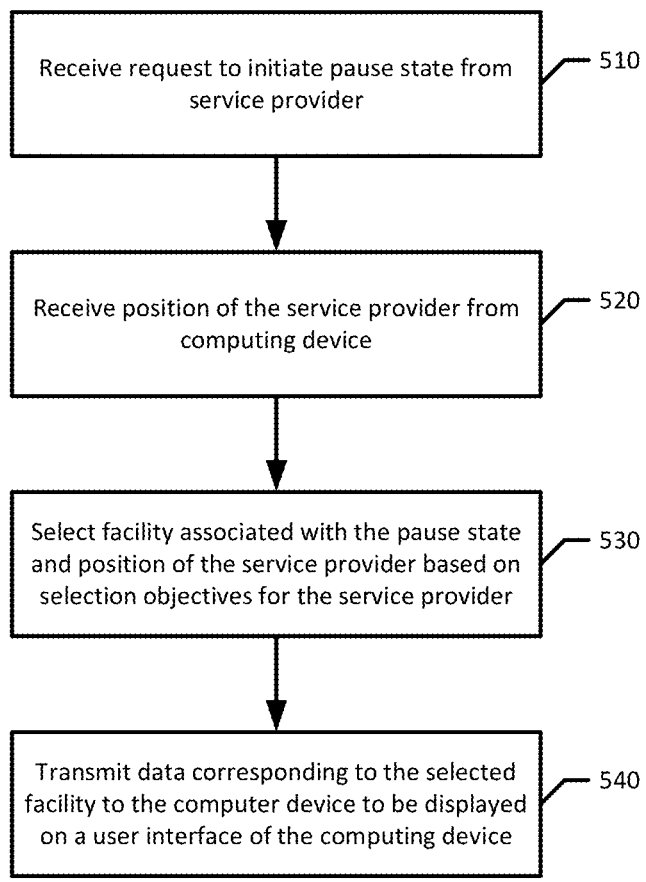
FIG. 5 is a flow chart describing an example method of operating a network service with facility recommendations, according to examples described herein.

FIG. 5 is a flow chart describing an example method of operating a network service with facility recommendations, according to examples described herein.

In some aspects, a network computer system receives a request to initiate a pause state from a service provider (510). For example, the service provider may request a pause in order to take a short break to use the bathroom or get coffee. When selecting the pause state, a service provider can specify a duration of time for the pause state. Alternatively, or if no duration is specified, the pause state lasts for a duration of time based on either a default setting or stored service provider preferences. Service providers can also choose to alter the duration of the pause state after making the request.

In one aspect, once the pause state is triggered, a facility recommendation service provided with the network computer system recommends local facilities (e.g., gas stations, public restrooms, fast food restaurants, coffee shops, etc.) to accommodate the service provider during the break. In order to determine which facilities are local to the service provider, the network computer system receives a position of the service provider from a computing device equipped with a location-based resource (520). For example, a global positioning system (GPS) tracker built in to a mobile phone running the service provider application can transmit its location to the network computer system. The facility recommendation system then searches a facility datastore for local facilities based on the location of the service provider.

In order to determine which of the facilities to recommend, the facility recommendation service can estimate an impact that taking a break at that facility may have on selection objectives for the service provider. Selection objectives, or service objectives, include any metrics that the service provider or the network computer system can use to measure or evaluate performance of the service provider, service tasks, the network computer system itself, etc. Examples of selection objectives include idle time for the service provider, costs to the service provider or system, and revenues for the service provider or system. In addition, service objectives can include subjective assessments, such as provider satisfaction or contentment. Accordingly, the facility recommendation service can choose facilities in order to optimize one or more of the selection objectives, such as by reducing idle time for the service provider, reducing costs to the service provider, increasing revenues for the service provider, or increasing the comfort level of the service provider.

For each of the facilities, the facility recommendation service determines values for a number of criteria related to the selection objectives. In one aspect, the facility recommendation service estimates a travel distance and/or an amount of travel time between the service provider location and the facility. These estimates can take into consideration historical and current local conditions in the area, such as traffic, the difficulty of finding parking, how busy a given facility is, etc., which may increase the amount of time necessary for a service provider to reach the facility and complete a break. For example, one fast food restaurant with a public restroom may be five minutes away but typically require five minutes to find parking, whereas another may be eight minutes away but require negligible time to find parking. Thus, despite being further away, the second restaurant may be a better choice for reducing idle time for the service provider.

Once the selection objective criteria values are calculated, the facility recommendation service can rank and select facilities based on the selection objectives (530). In some aspects, an overall facility ranking is performed using a weighted ranking of at least some of the selection objectives. The facility recommendation service can use preferences and settings from the service provider to determine the selection objectives and their respective weights. For example, one service provider may place more weight on earning additional revenue, whereas another may place more weight on clean facilities and minimizing idle time.

The facility recommendation service transmits data corresponding to the selected facilities and their ranking to the computing device of the service provider to be displayed on a user interface of the computing device (540). In some aspects, the selected facilities are displayed as a list of facilities on the user interface of the computing device, sorted by ranking from top to bottom.

Figure 6:
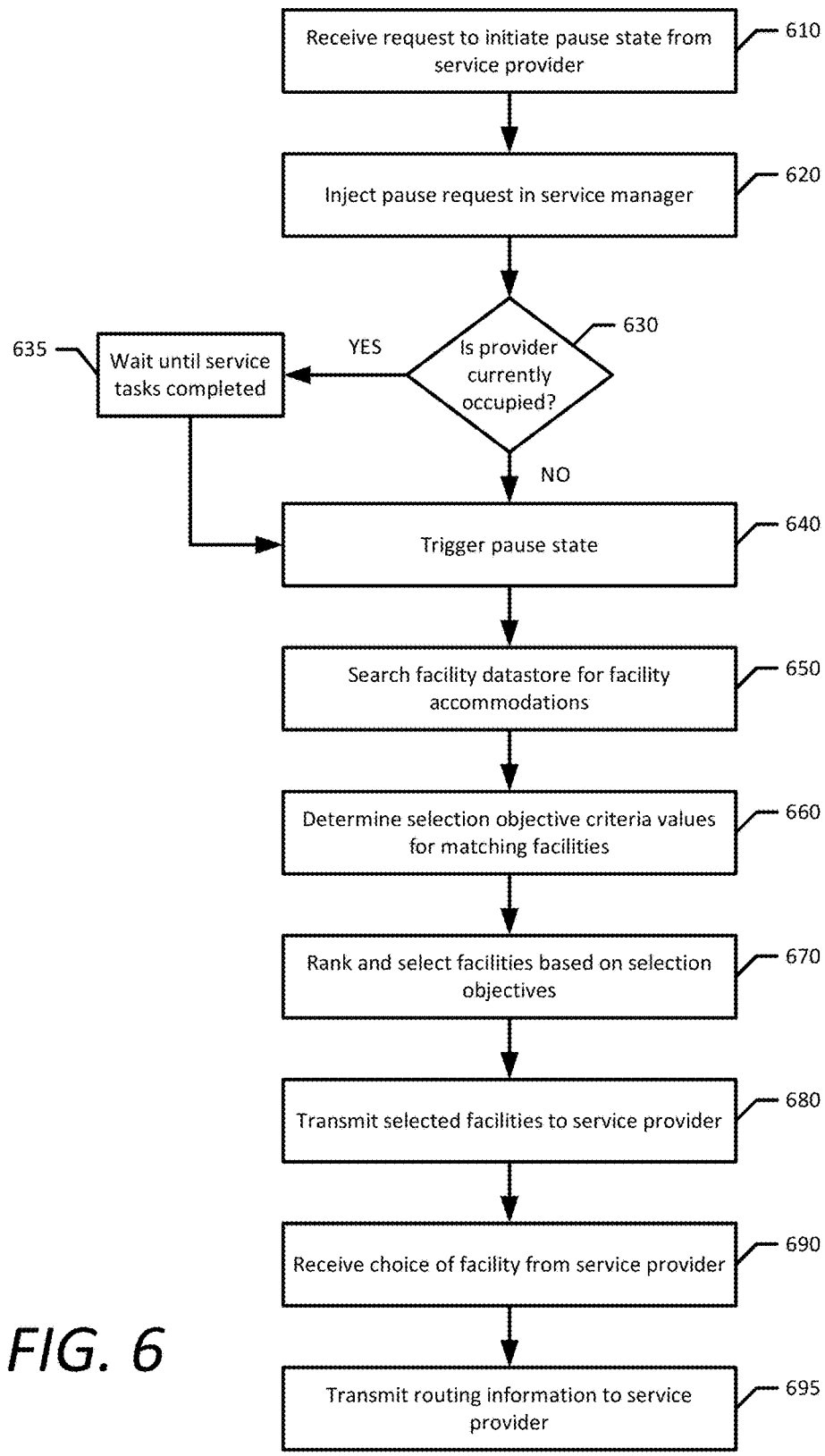
FIG. 6 is a flow chart describing an example method of recommending a facility to a service provider, according to examples described herein.

FIG. 6 is a flow chart describing an example method of recommending a facility to a service provider, according to examples described herein. During the day, service providers require breaks, whether to use the bathroom, refuel their vehicle, or grab a quick snack. The network computer system can utilize efficiency features such as forward dispatching and automatic acceptance to reduce downtime and improve the efficiency of the overall system for both providers and requesting customers; however, these features can make taking a break difficult for providers. Service providers may be able to block future service requests and go offline once their queue is empty, but while offline, they cannot take advantage of the efficiency features. In order to enable the benefits of these efficiency features to persist across breaks, a service provider can select to enter a pause state rather than go offline after their queue is empty.

In some aspects, a service provider selects the pause state through a service manager, or trip manager, interface of a service application that communicates the request to initiate the pause state to a network computer system (610). For example, the service provider may request a pause in order to take a short break to use the bathroom or get coffee. If the service provider intends to take an extended break to eat a full meal or end their current session or day, the provider can instead choose to block future service requests and go offline once their queue is empty. In one example, when selecting the pause state, a service provider can specify a duration of time for the pause state. Alternatively, or if no duration is specified, the pause state lasts for a duration of time based on either a default setting or stored service provider preferences. Service providers can also choose to alter the duration of the pause state after making the request. In some aspects, the network computer system can compile data on break times for service providers and iteratively improve default values.

The network computer system injects the pause request into the service manager for the service provider (620). As a result, the service provider is no longer considered available to fulfill service requests, and features such as forward dispatching do not consider the service provider as a candidate for incoming requests. The user interface for the service manager can update to include the pause request at the end of the queue, indicating to the service provider that the pause state begins once the prior requests in the queue are completed or otherwise removed.

In some aspects, the network computer system can determine whether the service provider is currently occupied when a pause request is received (630). If the service provider is occupied (e.g., currently transporting a passenger to a destination), the pause request is inserted into the service manager queue, and the network computer system waits until the service tasks are completed and the queue for the service provider is empty (635).

If the service provider is not occupied when the request is received or once the service tasks are completed, the network computer system can trigger the pause state for the service provider (640).

In one aspect, once the pause state is triggered, a facility recommendation service provided with the network computer system recommends local facilities (e.g., gas stations, public restrooms, fast food restaurants, coffee shops, etc.) to accommodate the service provider during the break (650). In order to determine which facilities are local to the service provider, the network computer system receives a position of the service provider from a computing device equipped with a location-based resource. For example, a global positioning system (GPS) tracker built in to a mobile phone running the service provider application can transmit its location to the network computer system. The facility recommendation system then searches a facility datastore for local facilities based on the location of the service provider. In other aspects, the facility recommendation service can search for facility accommodations prior to triggering the pause state, such as upon receiving the request to initiate the pause state. In these aspects, the facility recommendation service can search for facilities based on a destination for the service provider's service task. For example, if the service provider requests a break while providing transportation for a passenger, the facility recommendation service can search for facilities that are located near the planned drop off point for the passenger.

In addition to searching for facilities based on location, the facility recommendation service can search for facilities based on facility categories, or types of accommodation that each facility provides. For example, whether a restaurant has a public restroom or not. The service provider can select a category, such as gas stations or restrooms, through the service provider application in order to limit the facility search to facilities in that category. If the service provider does not specify a category when requesting the pause state or at any point before the pause state is triggered, the facility recommendation service can search on a default category or a category based on stored service provider preferences.

In one aspect, the facility recommendation service selects a default category used for facility searches based on predictive factors such as the time of day and how long the service provider has been online. For example, the facility recommendation service may default to searching for gas stations in the morning or evening when the service provider is more likely to need to refuel, and the facility recommendation service may default to searching for restrooms when the service provider has been online for an extended period of time without a break. In addition, the facility recommendation system can model predictive factors and determine preferences for the service provider based on previous behavior of the service provider or aggregate statistical data, subject to any privacy or opt-in settings the service provider has selected.

The facility recommendation service retrieves a set of facilities near the location (i.e., within a threshold distance) that match the selected or default category. In order to determine which of the facilities to recommend, the facility recommendation service can estimate an impact that taking a break at that facility may have on selection objectives for the service provider. Selection objectives, or service objectives, include any metrics that the service provider or the network computer system can use to measure or evaluate performance of the service provider, service tasks, the network computer system itself, etc. Examples of selection objectives include idle time for the service provider, costs to the service provider or system, and revenues for the service provider or system. In addition, service objectives can include subjective assessments, such as provider satisfaction or contentment. Accordingly, the facility recommendation service can choose facilities in order to optimize one or more of the selection objectives, such as by reducing idle time for the service provider, reducing costs to the service provider, increasing revenues for the service provider, or increasing the comfort level of the service provider.

For each of the facilities, the facility recommendation service determines values for a number of criteria related to the selection objectives (660). In one aspect, the facility recommendation service estimates a travel distance and/or an amount of travel time between the service provider location and the facility. These estimates can take into consideration historical and current local conditions in the area, such as traffic, the difficulty of finding parking, how busy a given facility is, etc., which may increase the amount of time necessary for a service provider to reach the facility and complete a break. For example, one fast food restaurant with a public restroom may be five minutes away but typically require five minutes to find parking, whereas another may be eight minutes away but require negligible time to find parking. Thus, despite being further away, the second restaurant may be a better choice for reducing idle time for the service provider.

The facility recommendation service can also estimate, or retrieve from another system (e.g., the on-demand provisioning server), supply provisioning information for the network service for a surrounding area of each of the facilities. The supply provisioning information indicates supply and demand for services in the surrounding areas of each of the facilities. The supply provisioning information can include historical data, current data, and predictive data for the future. Among other values, these data can include counts or estimates of service providers, service requesters, service requests, time between receiving service requests for service providers (i.e., idle time), wait time for service requesters, and pricing data for services in each area. In some aspects, the supply provisioning information is estimated for a time when the pause state is expected to end, and a set duration for the pause state begins once the service provider arrives at a chosen facility. For example, if a facility is five minutes from the service provider and the pause state is set for a 15 minute break, the facility recommendation service estimates supply provisioning information for 20 minutes in the future for the area surrounding that facility.

In addition to travel distance/time and supply provisioning criteria, the facility recommendation service can also retrieve ratings and various details related to the selection objectives. Ratings for facilities can include user-submitted scores and reviews for each facility, including ratings for cleanliness, quality, etc. Other details can include accessibility information (e.g., handicap access), prices for food or gas, and any discounts that may be available for service providers.

Based on combinations of the criteria and their values, the facility recommendation service estimates an impact that taking a break at each facility may have on the selection objectives for the service provider. In some aspects, an estimated idle time for the service provider includes travel time to the facility and an expected wait time, based on the supply provisioning information, to receive a service request from the on-demand network service for a service provider in the pause state at or near that facility. Estimated costs to the service provider can include fuel or food prices at the facility in addition to fuel costs for driving to the facility. The facility recommendation service can estimate revenues for the service provider using pricing data from the supply provisioning information and the expected wait time to receive service requests.

Once the selection objective criteria values are calculated, the facility recommendation service can rank and select facilities based on the selection objectives (670). In some aspects, an overall facility ranking is performed using a weighted ranking of at least some of the selection objectives. The facility recommendation service can use preferences and settings from the service provider to determine the selection objectives and their respective weights. For example, one service provider may place more weight on earning additional revenue, whereas another may place more weight on clean facilities and minimizing idle time.

The facility recommendation service transmits data corresponding to the selected facilities and their rankings to the computing device of the service provider to be displayed on a user interface of the computing device (680). In some aspects, the selected facilities are displayed as a list of facilities on the user interface of the computing device, sorted by ranking from top to bottom.

When the service provider chooses one of the facilities at which to take a break, the on-demand network service can receive the choice from the service provider computing device (690). In one aspect, the service provider can request routing information to navigate to the facility from the current location of the service provider. If requested, the on-demand network service transmits the routing information to be displayed on the user interface of the service application running on the service provider computing device (695). In other aspects, the facility recommendation service can choose one of the selected facilities (e.g., the highest rated facility) and automatically provide routing information to the selected facility to the service provider.

Figure 7:
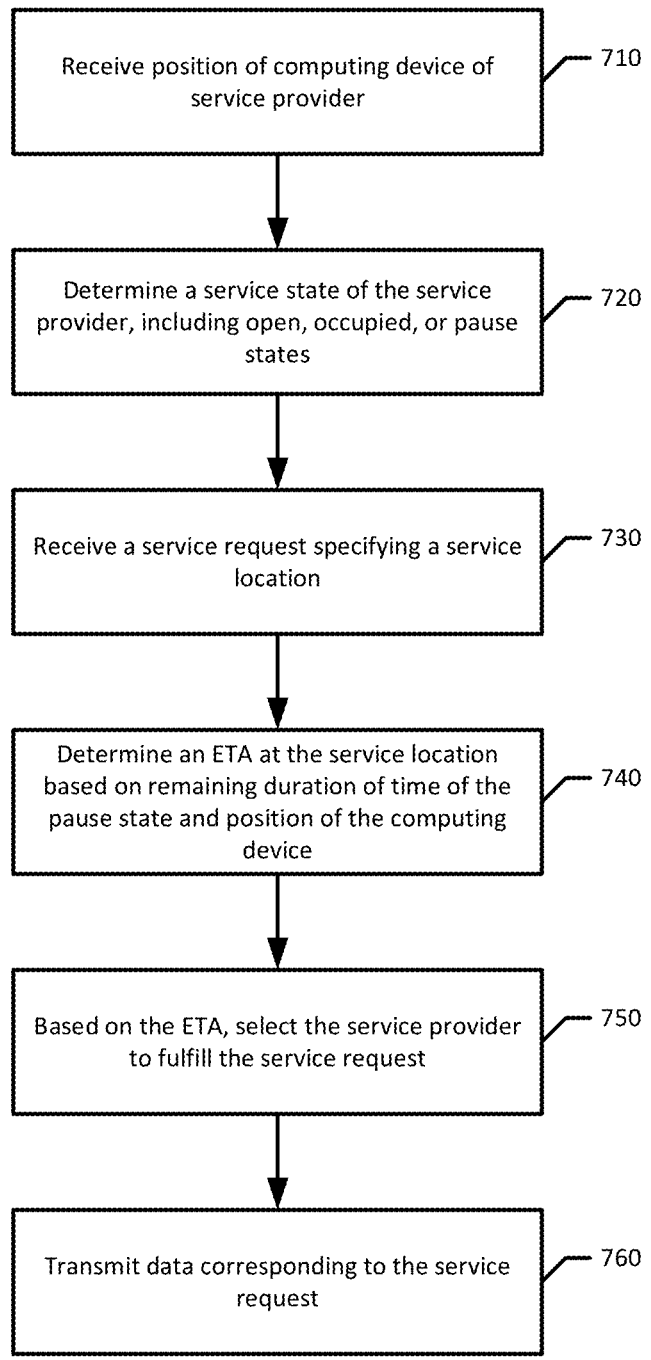
FIG. 7 is a flow chart describing an example method of operating a network service with pause states, according to examples described herein.

FIG. 7 is a flow chart describing an example method of operating a network service with pause states, according to examples described herein. In some aspects, an on-demand network service receives a position of a computing device of a service provider (710). In order to determine the current location of the service provider and select appropriate providers for incoming service requests, the network computer system can determine the location of the service provider from a computing device equipped with a location-based resource. For example, a global positioning system (GPS) tracker built in to a mobile phone running the service provider application can transmit its location to the network computer system. In an alternative implementation, the network computer system can determine the location of the service provider in the pause state based on a choice of facility from the facility recommendation service.

In some aspects, the on-demand network service determines a service state or mode of the service provider (720). Service providers can select various states within the service provider application, such as an online state that indicates the service provider is available and willing to fulfill service invitations or a pause state that indicates the service provider is on a break and intends to resume fulfilling service invitations after the break.

According to examples, service requesters can utilize the on-demand network service through a service requester application and transmit a service request over a network to the network computer system (730). The network computer system can utilize service provider locations to calculate ETA data for proximate service providers and provide the ETA data to the service requester devices.

For a service provider in the pause state, the on-demand network service can determine an ETA at the service location for the service provider based on the remaining duration of time of the pause state and the position of the service provider or service provider computing device (740). In some aspects, the ETA at the service location for the service provider in the pause state is determined based at least on a sum of the travel time from the position of the computing device to the service location and the remaining duration of time that service provider is unavailable in the pause state.

The network computer system can utilize service provider ETAs in order to select one of the proximate service providers to fulfill the service request (750). In some aspects, the network computer system selects a service provider that has the lowest ETA to the service location, whether it is an available service provider or a service provider in the pause state.

If the on-demand network service selects the provider in the pause state, the on-demand network service transmits data corresponding to the service request to the provider (760).

Figure 8:
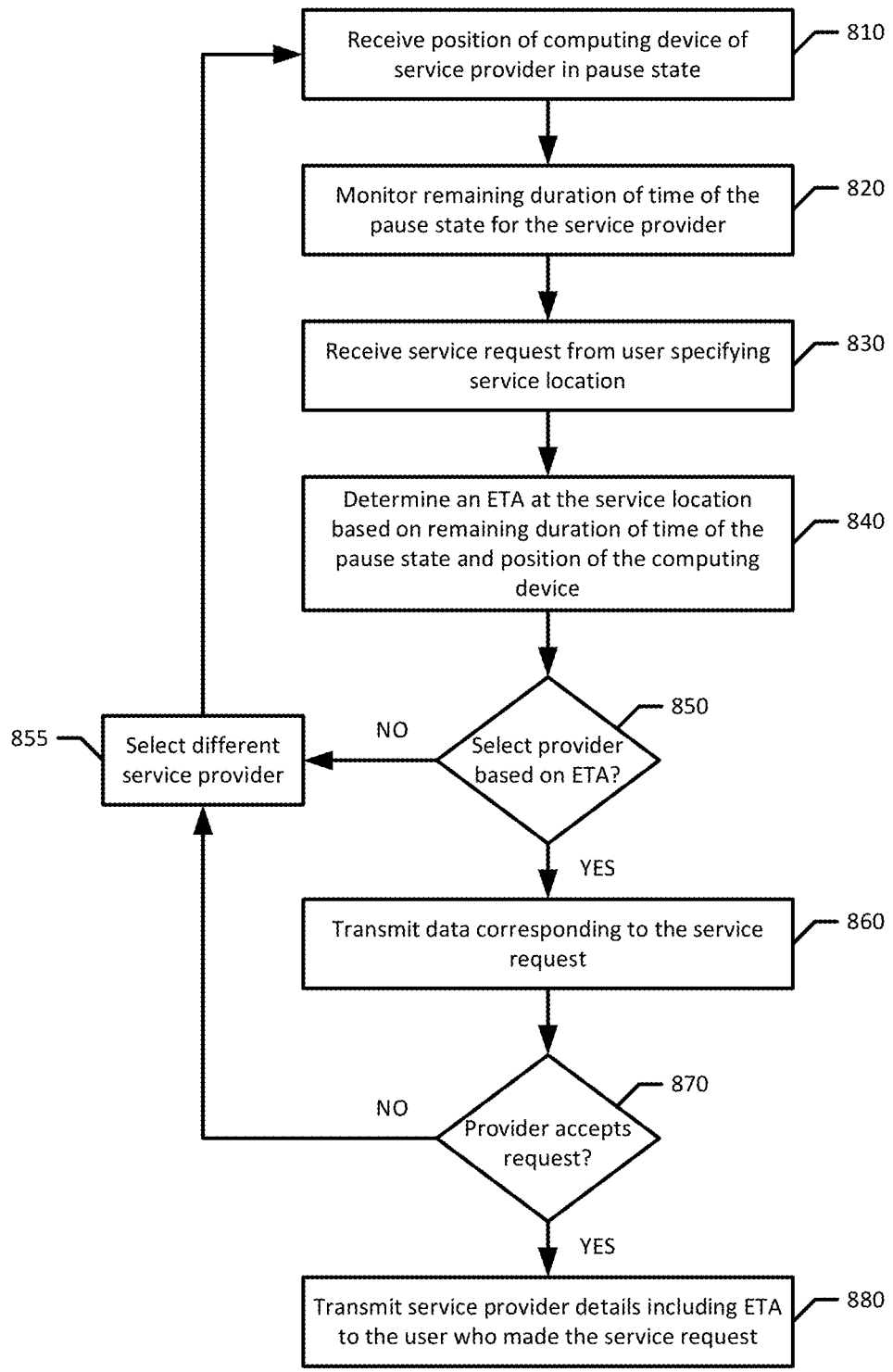
FIG. 8 is a flow chart describing an example method of selecting a service provider in a pause state to fulfill a service request, according to examples described herein.

FIG. 8 is a flow chart describing an example method of selecting a service provider in a pause state to fulfill a service request, according to examples described herein. By sending service requests to providers in a pause state (e.g., on break using the restroom, refueling their vehicle, grabbing a snack, etc.), the provider can queue the request and act on it as soon as their break is over, thereby reducing idle time spent waiting to receive a service request, increasing service provider availability, reducing wait times for users, and delivering a more reliable product for users.

In some aspects, an on-demand network service receives a position of a computing device of a service provider in a pause state (810). In order to determine the current location of the service provider and select appropriate providers for incoming service requests, the network computer system can determine the location of the service provider from a computing device equipped with a location-based resource. For example, a global positioning system (GPS) tracker built in to a mobile phone running the service provider application can transmit its location to the network computer system. In an alternative implementation, the network computer system can determine the location of the service provider in the pause state based on a choice of facility from the facility recommendation service.

While the service provider is in the pause state, the on-demand network service can monitor a remaining duration of time for the pause state (820). In one aspect, the on-demand network service stores time and duration information for the pause state, including when the pause state for the service provider begins, ends, and its total expected duration. A provider selection engine processes incoming service requests from users to select service providers to fulfill the service requests. In some aspects, the provider selection engine can access the stored time and duration information to calculate estimated times to arrival (ETA) for providers in the pause state.

According to examples, service requesters can utilize the on-demand network service through a service requester application and transmit a service request over a network to the network computer system (830). In certain implementations, the service requester can view multiple different service types managed by the network computer system, such as ride-pooling, a basic ride-share service type, a luxury vehicle service type, a van or large vehicle service type, professional services (e.g., where the service provider is certified), an on-demand self-driving vehicle service, and the like. The network computer system can utilize service provider locations to calculate ETA data for proximate service providers for each respective service and provide the ETA data to the service requester devices.

In some examples, the service request can include a service location within a given region (e.g., a metropolitan area managed by one or more datacenters corresponding to the network computer system) where a selected service provider is to rendezvous with the service requester. The service requester can input the service location by setting a location pin on a user interface of the service requester application, or the service location can be determined by a current location of the service requester (e.g., utilizing location-based resources of the service requester device). The network computer system can utilize the service provider locations in order to select one of the proximate service providers to fulfill the service request. In some aspects, the network computer system selects an available service provider that is closest to the service location with respect to distance or time.

For a service provider in the pause state, the on-demand network service can determine an ETA at the service location for the service provider based on the remaining duration of time of the pause state and the position of the service provider or service provider computing device (840). In some aspects, during a first phase of the pause state, the service provider is set as ineligible for requests regardless of ETA. For example, the on-demand network service may pass over a service provider who has been on a break for fewer than five minutes. However, once the remaining duration of time for the pause state crosses a threshold, the service provider is made available for requests again, subject to an ETA penalty, or "negative ETA," based on the remaining duration of time for the pause state. The ETA penalty reduces the likelihood that service providers in a pause state receive a service request because their rank in the provider selection process is reduced below active, open service providers in the area due to their higher ETA. In some aspects, the ETA at the service location for the service provider in the pause state is determined based at least on a sum of the travel time from the position of the computing device to the service location and the remaining duration of time that service provider is unavailable in the pause state. Therefore, as the remaining duration for the pause state decreases, the corresponding ETA penalty is also reduced, and the likelihood that the service provider receives a service request increases.

The network computer system can utilize service provider ETAs in order to select one of the proximate service providers to fulfill the service request. In some aspects, the network computer system selects a service provider that has the lowest ETA to the service location, whether it is an available service provider or a service provider in the pause state with a negative ETA applied (850). If other nearby service providers have shorter ETAs than the service provider in the pause state, the on-demand network service may select one of the other providers (855).

If the on-demand network service selects the provider in the pause state, the on-demand network service transmits data corresponding to the service request to the provider (860). When the service provider receives the data corresponding to the service request, the provider can select whether to accept or decline the request (870). Since the ETA attached to the request already accounts for the time remaining in the pause state, the service provider can finish their break and begin heading to the service location once the pause state expires.

During the pause state when the service provider has not accepted any service request, the provider can select to extend the duration of the pause state through the service provider application. Extending the duration of the pause state allows the provider to take a longer break, but also increases the current ETA penalty accordingly to account for the longer remaining duration of the break.

If the service provider accepts the request, the on-demand network service can transmit service provider details including the ETA to the user who made the service request (880). Since the ETA for service providers in the pause state includes both the time estimated to travel to the service location and the ETA penalty for the remaining duration that provider is on break, there is no distinction between providers in the open state and providers in the pause state from the perspective of the user.

In some aspects, the service provider can opt to end their break early and cancel the pause state through the service provider application. In this case, the on-demand network service can update the ETA to remove the ETA penalty associated with the pause state and provide the updated ETA to the service requester.

User Interface Example

Figure 9:
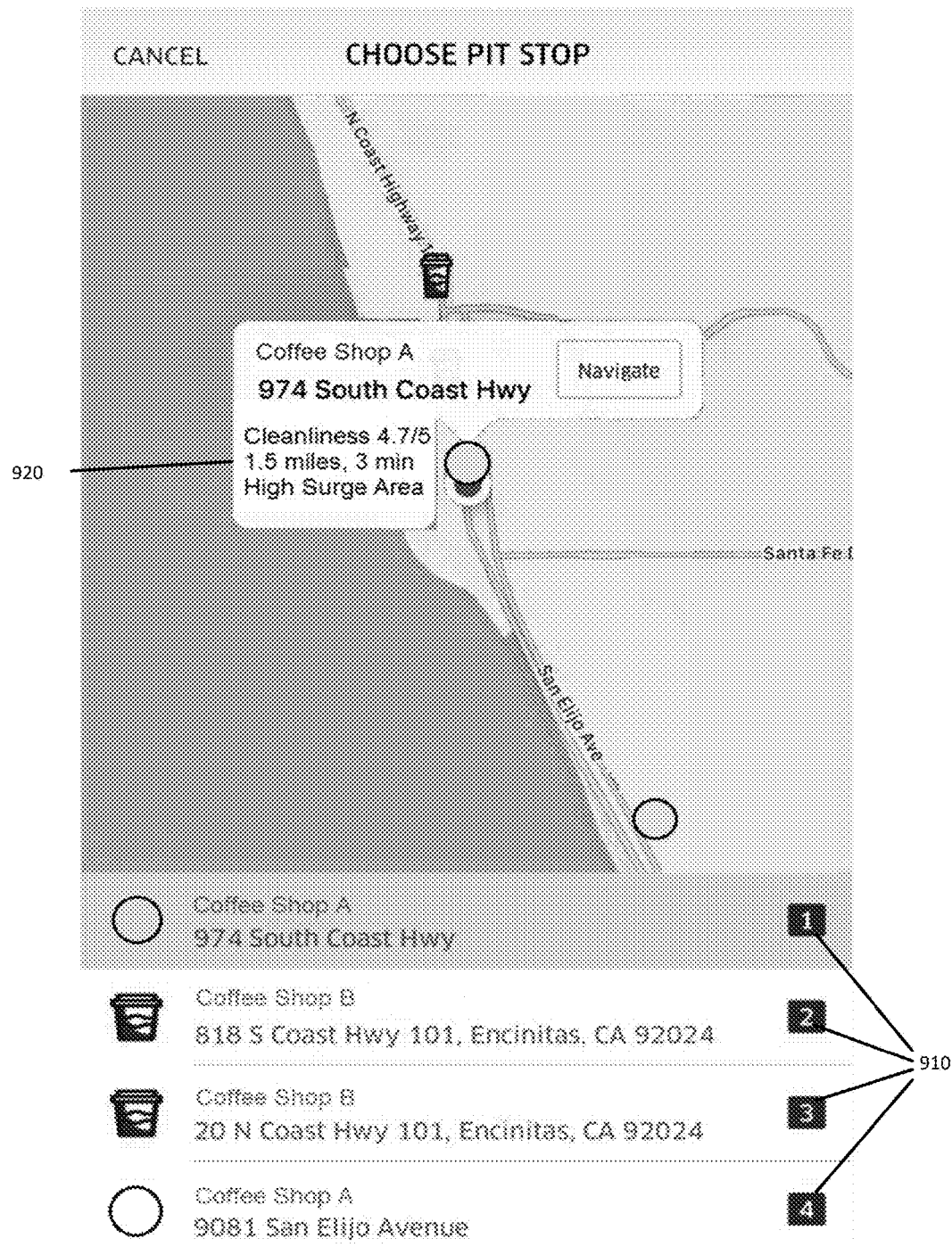
FIG. 9 illustrates an example user interface on a service provider device, according to examples described herein.

FIG. 9 illustrates an example user interface on a service provider device, according to examples described herein. Execution of a service provider application on a service provider device can cause the device to generate the user interface on the device's touch-sensitive display.

In some aspects, a service provider selects a pause state through a service manager, or trip manager, interface of the service provider application in order to take a short break to use the bathroom, refuel their vehicle, get coffee, etc. A facility recommendation service provided with a network computer system recommends local facilities (e.g., gas stations, public restrooms, fast food restaurants, coffee shops, etc.) to accommodate the service provider during the break. In order to determine which facilities are local to the service provider, the network computer system receives a position of the service provider from a computing device equipped with a location-based resource. For example, a global positioning system (GPS) tracker built in to a mobile phone running the service provider application can transmit its location to the network computer system. The facility recommendation system then searches a facility datastore for local facilities based on the location of the service provider.

In addition to searching for facilities based on location, the facility recommendation service can search for facilities based on facility categories, or types of accommodation that each facility provides. For example, whether a restaurant has a public restroom or not. The service provider can select a category, such as gas stations or restrooms, through the service provider application in order to filter the facility search to only look for facilities in that category. If the service provider does not specify a category when requesting the pause state or at any point before the pause state is triggered, the facility recommendation service can search on a default category or a category based on saved service provider preferences.

The facility recommendation service retrieves a set of facilities near the location (i.e., within a threshold distance)

that match the selected or default category. In order to determine which of the facilities to recommend, the facility recommendation service can estimate an impact that taking a break at that facility may have on selection objectives for the service provider. Selection objectives, or service objectives, include any metrics that the service provider or the network computer system can use to measure or evaluate performance of the service provider, service tasks, the network computer system itself, etc. For each of the facilities, the facility recommendation service determines values for a number of criteria related to the selection objectives. In one aspect, the facility recommendation service estimates a travel distance and/or an amount of travel time between the service provider location and the facility. These estimates can take into consideration historical and current conditions in the area, such as traffic, the difficulty of finding parking, how busy a given facility is, etc., which may increase the amount of time necessary for a service provider to reach the facility and complete a break.

Once the selection objective criteria values are calculated, the facility recommendation service can rank and select facilities based on the selection objectives. In some aspects, an overall facility ranking is performed using a weighted ranking of at least some of the selection objectives. The facility recommendation service can use preferences and settings from the service provider to determine the selection objectives and their respective weights. The facility recommendation service transmits data corresponding to the selected facilities and their ranking to the computing device of the service provider to be displayed on the user interface of the computing device. In some aspects, the selected facilities are displayed as a list of facilities on the user interface of the computing device, sorted by ranking from top to bottom.

In the example user interface illustrated in FIG. 9, the facility recommendation service returns the list of facilities 910, including four coffee shops, which the service provider application displays to the service provider. When the provider selects a facility from the list, the service provider application can display various selection objective criteria values 920 associated with that facility. In the example illustrated, the user interface displays a cleanliness rating, distance and time to reach the coffee shop, and an indication that the area surrounding the coffee shop is a high surge area (i.e., service prices are above normal rates). In some aspects, service providers can interact with the selection objective criteria values 920 to obtain more information and set preferences for which values to display.

The example user interface additionally displays a navigation button, which the service provider can use to request routing information to navigate to the facility from the current location. If requested, the on-demand network service transmits the routing information to be displayed on the user interface.

According to examples provided herein, the network computer system can include a content engine that manages the manner in which content is displayed on the service requester devices and/or the service provider devices. Regarding the service requester devices, the content engine can provide content updates based on user inputs on a user interface generated by the service provider application. For example, a user selection on a content feature of the service provider application can cause the content engine to generate a new screen on the service provider application or cause a current screen to pivot between certain displayed features. Additionally, the content engine can adjust the look and feel of a list picker interface for the list of facilities 910 or for information boxes to overlay the map content, such as the selection objective criteria values 920.

Service Provider Device

Figure 10:
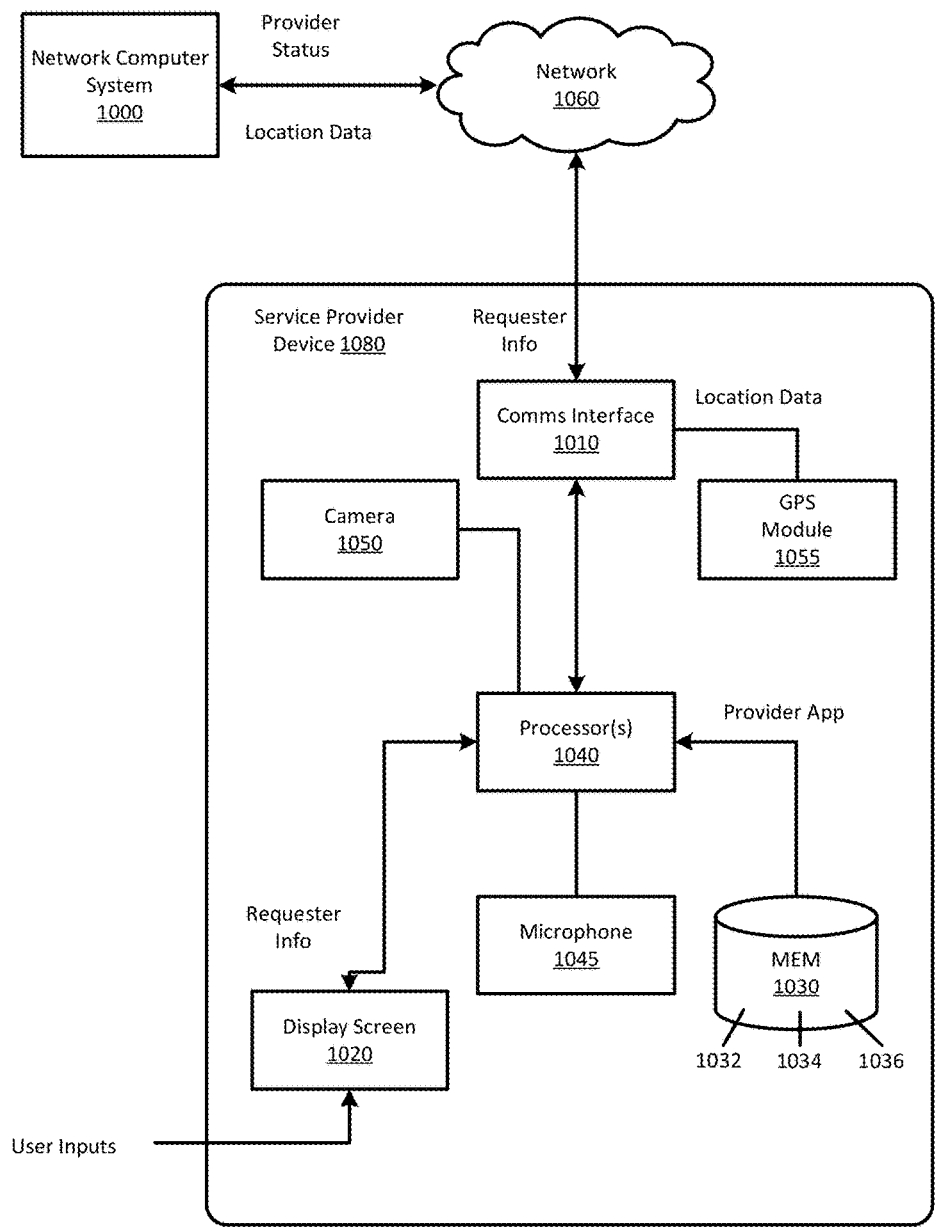
FIG. 10 is a block diagram illustrating an example service provider device executing a designated service provider application for an on-demand service, as described herein.

FIG. 10 is a block diagram illustrating an example service provider device executing a designated service provider application for an on-demand service, as described herein. In many implementations, the service provider device 1080 can comprise a mobile computing device, such as a smartphone, tablet computer, laptop computer, VR or AR headset device, and the like. As such, the service provider device 1080 can include typical telephony features such as a microphone 1045, a camera 1050, and a communication interface 1010 to communicate with external entities using any number of wireless communication protocols. In certain aspects, the service provider device 1080 can store a designated application (e.g., a service provider application 1032) in a local memory 1030. In many aspects, the service provider device 1080 further stores information corresponding to a contacts list 1034 and calendar appointments 1036 in the local memory 1030. In variations, the memory 1030 can store additional applications executable by one or more processors 1040 of the service provider device 1080, enabling access and interaction with one or more host servers over one or more networks 1060.

In response to user input, the service provider application 1032 can be executed by a processor 1040, which can cause an application interface to be generated on a display screen 1020 of the service provider device 1080. The application interface can enable the service provider to, for example, check current price levels and availability for the on-demand arrangement service. In various implementations, the application interface can further enable the service provider to select from multiple ride service types, such as a carpooling service type, a regular ride-sharing service type, a professional ride service type, a van on-demand service type, a luxurious ride service type, and the like.

The provider can enter various states or modes, such as an online mode or a pause state via user inputs provided on the application interface. For example, the provider can choose a duration for the pause state and select a facility from a recommended list of facilities to accommodate the provider during the pause state. As provided herein, the service provider application 1032 can further enable a communication link with a network computer system 1000 over the network 1060, such as the network computer system 100 as shown and described with respect to FIG. 1. Furthermore, as discussed herein, the service provider application 1032 can display requester information on the application interface that includes data regarding a service requester so that the provider can choose whether to accept or reject a service invitation received from the network computer system 1000.

The processor 1040 can transmit the provider status (i.e., modes the provider is in) via a communications interface 1010 to the backend network computer system 1000 over a network 1060. In various examples, the service provider device 1080 can further include a GPS module 1055, which can provide location data indicating the current location of the provider to the network computer system 1000 to select an appropriate service provider to fulfill user service requests. In alternative aspects, hard-wired circuitry may be used in place of or in combination with software instructions to implement aspects described herein. Thus, aspects described are not limited to any specific combination of hardware circuitry and software.

Hardware Diagram

Figure 11:
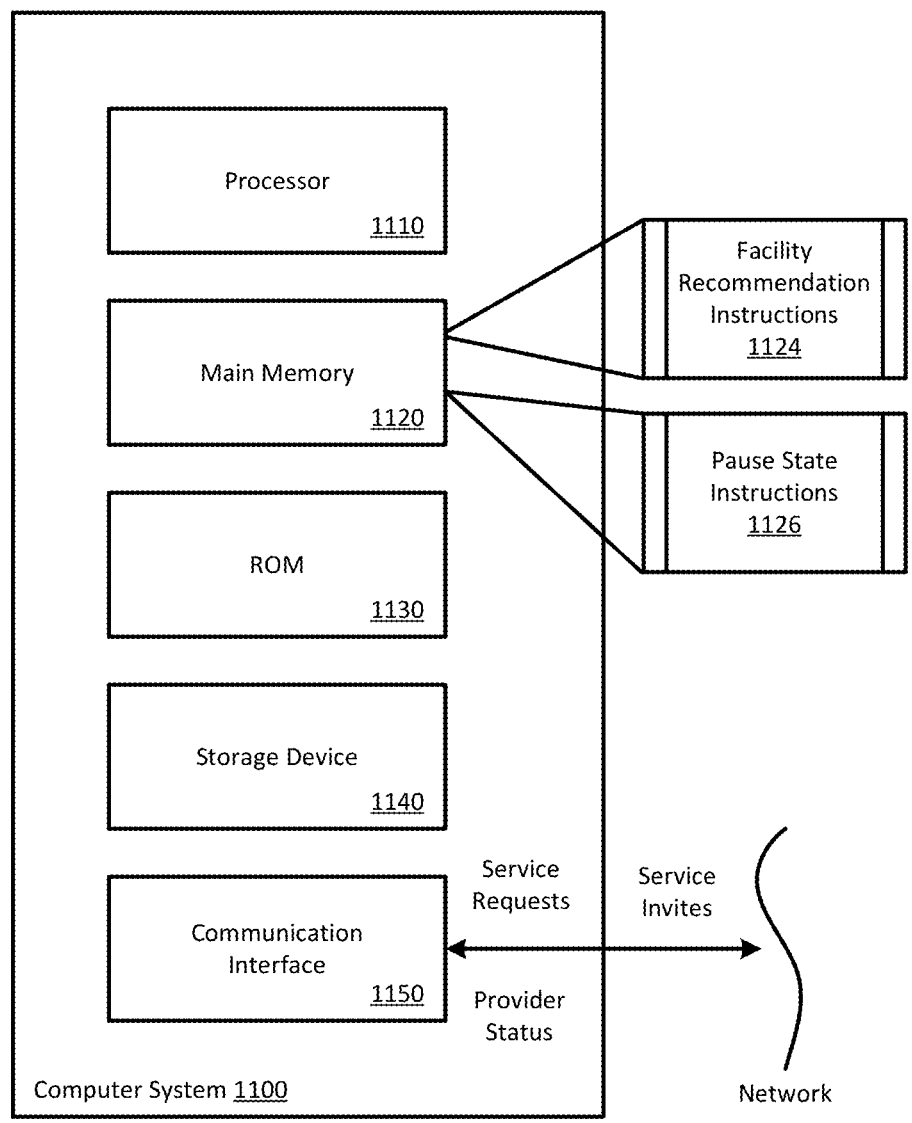
FIG. 11 is a block diagram that illustrates a computer system upon which aspects described herein may be implemented.

FIG. 11 is a block diagram that illustrates a computer system upon which examples described herein may be implemented. A computer system 1100 can be implemented on, for example, a server or combination of servers. For example, the computer system 1100 may be implemented as part of a network service for providing on-demand services. In the context of FIG. 1, the network computer system 100 may be implemented using a computer system 1100 such as described by FIG. 11. The network computer system 100 may also be implemented using a combination of multiple computer systems as described in connection with FIG. 11.

In one implementation, the computer system 1100 includes processing resources 1110, a main memory 1120, a read-only memory (ROM) 1130, a storage device 1140, and a communication interface 1150. The computer system 1100 includes at least one processor 1110 for processing information stored in the main memory 1120, such as provided by a random access memory (RAM) or other dynamic storage device, for storing information and instructions which are executable by the processor 1110. The main memory 1120 also may be used for storing temporary variables or other intermediate information during execution of instructions to be executed by the processor 1110. The computer system 1100 may also include the ROM 1130 or other static storage device for storing static information and instructions for the processor 1110. A storage device 1140, such as a magnetic disk or optical disk, is provided for storing information and instructions.

The communication interface 1150 enables the computer system 1100 to communicate with one or more networks (e.g., a cellular network) through use of the network link (wireless or wired). Using the network link, the computer system 1100 can communicate with one or more computing devices, one or more servers, and/or one or more self-driving vehicles. In accordance with some examples, the computer system 1100 receives service requests from mobile computing devices of individual users. The executable instructions stored in the memory 1130 can include facility recommendation instructions 1124 and pause state instructions 1126 to perform one or more of the methods described herein when executed.

By way of example, the instructions and data stored in the memory 1120 can be executed by the processor 1110 to implement an example network computer system 100 of FIG. 1. In performing the operations, the processor 1110 can handle service requests and provider statuses and submit service invitations to facilitate fulfilling the service requests. The processor 1110 executes instructions for the software and/or other logic to perform one or more processes, steps and other functions described with implementations, such as described by FIGS. 1 through 10.

Examples described herein are related to the use of the computer system 1100 for implementing the techniques described herein. According to one example, those techniques are performed by the computer system 1100 in response to the processor 1110 executing one or more sequences of one or more instructions contained in the main memory 1120. Such instructions may be read into the main memory 1120 from another machine-readable medium, such as the storage device 1140. Execution of the sequences of instructions contained in the main memory 1120 causes the processor 1110 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mention of the particular feature. Thus, the absence of describing combinations should not preclude claiming rights to such combinations.

What is claimed is:

1. A method for operating a network service, the method being performed by one or more processors of a computing system and comprising:

remotely monitoring computing devices of a plurality of service providers to receive provider data corresponding to positions of each computing device, as determined by location-based resources of each computing device, and to determine a service state of each service provider, the service state being selected from a plurality of candidate service states including (i) an open state, indicating the service provider is active and unassigned to any service request, (ii) an occupied state, indicating the service provider is assigned to a corresponding service request, and (iii) a pause state, indicating the service provider is unavailable for a remaining duration of time;

determining supply provisioning information for the network service based at least on the positions of each computing device and the service states of the plurality of service providers;

receiving, from a first service provider over a network, further provider data corresponding to a request to initiate the pause state with the network service;

in response to receiving the request, selecting a facility based on a selection objective, the facility selected from a plurality of facilities that are determined to accommodate the first service provider during the pause state, the plurality of facilities chosen based at least on one of (i) the position of the first service provider and (ii) a destination of a service task that is to be completed by the first service provider, wherein the selection objective is based at least on the supply provisioning information for the network service for a surrounding area of each of the plurality of facilities; and transmitting data corresponding to the selected facility to the computing device of the first service provider to be displayed on a user interface of the computing device.

2. The method of claim 1, wherein the data corresponding to the selected facility is to be displayed within a list of facilities on the user interface of the computing device.

3. The method of claim 2, further comprising:

receiving, from the first service provider, input choosing the selected facility from the list of facilities; and transmitting navigation information corresponding to a route from the position of the computing device of the first service provider to the selected facility to be displayed on the user interface of the computing device.

4. The method of claim 1, wherein the selection objective includes one or more of reducing idle time for the first service provider, reducing costs to the first service provider, and increasing revenues for the first service provider.

5. The method of claim 1, wherein the supply provisioning information includes current pricing data for the network service for the surrounding area of each of the plurality of facilities.

6. The method of claim 1, wherein the selection objective is based on estimated supply provisioning information for a time when the pause state is expected to end.

7. The method of claim 1, wherein selecting the facility is also based on facility ratings, accessibility, cleanliness, service provider preferences, distance from the position or destination, and/or available discounts.

8. The method of claim 1, wherein the data corresponding to the selected facility is displayed on the user interface upon determining that the first service provider is not currently providing service to a user.

9. The method of claim 1, further comprising:
receiving, from the first service provider, a selection of a type of facility accommodation, wherein types of facility accommodation include gas stations and restrooms; and
filtering the plurality of facilities based on whether they include the type of facility accommodation selected.

10. The method of claim 9, further comprising:
selecting a default type of facility accommodation based on a current time of day and/or a duration of time the first service provider has been active that day.

11. A network computer system comprising:
one or more processors; and
one or more memory resources storing instructions that, when executed by the one or more processors, cause the network computer system to:
remotely monitor computing devices of a plurality of service providers to receive provider data corresponding to positions of each computing device, as determined by location-based resources of each computing device, and to determine a service state of each service provider, the service state being selected from a plurality of candidate service states including (i) an open state, indicating the service provider is active and unassigned to any service request, (ii) an occupied state, indicating the service provider is assigned to a corresponding service request, and (iii) a pause state, indicating the service provider is unavailable for a remaining duration of time;
determine supply provisioning information for a network service based at least on the positions of each computing device and the service states of the plurality of service providers;
receive, from a first service provider over a network, further provider data corresponding to a request to initiate the pause state with the network service;
in response to receiving the request, select a facility based on a selection objective, the facility selected from a plurality of facilities that are determined to accommodate the first service provider during the pause state, the plurality of facilities chosen based at least on one of (i) the position of the first service provider and (ii) a destination of a service task that is to be completed by the first service provider,
wherein the selection objective is based at least on the supply provisioning information for the network service for a surrounding area of each of the plurality of facilities; and
transmit data corresponding to the selected facility to the computing device of the first service provider to be displayed on a user interface of the computing device.

12. The network computer system of claim 11, wherein the data corresponding to the selected facility is to be displayed within a list of facilities on the user interface of the computing device.

13. The network computer system of claim 12, further comprising instructions to cause the network computer system to:
receive, from the first service provider, input choosing the selected facility from the list of facilities; and
transmit navigation information corresponding to a route from the position of the computing device of the first service provider to the selected facility to be displayed on the user interface of the computing device.

14. The network computer system of claim 11, wherein the selection objective includes one or more of reducing idle time for the first service provider, reducing costs to the first service provider, and increasing revenues for the first service provider.

15. The network computer system of claim 11, wherein the supply provisioning information includes current pricing data for the network service for the surrounding area of each of the plurality of facilities.

16. A non-transitory computer-readable medium that stores instructions, executable by one or more processors, to cause the one or more processors to perform operations that comprise:
remotely monitoring computing devices of a plurality of service providers to receive provider data corresponding to positions of each computing device, as determined by location-based resources of each computing device, and to determine a service state of each service provider, the service state being selected from a plurality of candidate service states including (i) an open state, indicating the service provider is active and unassigned to any service request, (ii) an occupied state, indicating the service provider is assigned to a corresponding service request, and (iii) a pause state, indicating the service provider is unavailable for a remaining duration of time;
determining supply provisioning information for a network service based at least on the positions of each computing device and the service states of the plurality of service providers;
receiving, from a first service provider over a network, further provider data corresponding to a request to initiate the pause state with the network service;
in response to receiving the request, selecting a facility based on a selection objective, the facility selected from a plurality of facilities that are determined to accommodate the first service provider during the pause state, the plurality of facilities chosen based at least on one of (i) the position of the first service provider and (ii) a destination of a service task that is to be completed by the first service provider,
wherein the selection objective is based at least on the supply provisioning information for the network service for a surrounding area of each of the plurality of facilities; and
transmitting data corresponding to the selected facility to the computing device of the first service provider to be displayed on a user interface of the computing device.

* * * * *